United States Patent
Umi et al.

(10) Patent No.: US 11,067,935 B2
(45) Date of Patent: Jul. 20, 2021

(54) MEDIUM CONVEYING APPARATUS FOR CORRECTING A SKEW OF A MEDIUM

(71) Applicant: PFU LIMITED, Kahoku (JP)

(72) Inventors: Takayuki Umi, Kahoku (JP); Shigeharu Okano, Kahoku (JP)

(73) Assignee: PFU LIMITED, Kahoku (JP)

(*) Notice: Subject to any disclaimer, the term of this patent is extended or adjusted under 35 U.S.C. 154(b) by 0 days.

(21) Appl. No.: 16/667,635

(22) Filed: Oct. 29, 2019

(65) Prior Publication Data

US 2020/0201232 A1 Jun. 25, 2020

(30) Foreign Application Priority Data

Dec. 20, 2018 (JP) .............................. JP2018-238681

(51) Int. Cl.
G03G 15/00 (2006.01)

(52) U.S. Cl.
CPC ..... *G03G 15/6567* (2013.01); *B65H 2220/02* (2013.01)

(58) Field of Classification Search
CPC ............ B65H 2220/01; B65H 2220/02; G03G 15/6511; G03G 15/6567; G03G 15/6508; G03G 15/6564; G03G 2215/00396
See application file for complete search history.

(56) References Cited

U.S. PATENT DOCUMENTS

| | | | |
|---|---|---|---|
| 5,597,155 A | 1/1997 | Guido et al. | |
| 6,059,285 A | 5/2000 | Suga et al. | |
| 2012/0113488 A1 | 5/2012 | Machida et al. | |
| 2012/0217698 A1* | 8/2012 | Sugano | B65H 9/002 271/225 |
| 2013/0234387 A1* | 9/2013 | Moto | B65H 9/002 271/228 |
| 2013/0241145 A1 | 9/2013 | Yasukawa | |
| 2017/0210582 A1 | 7/2017 | Okano | |
| 2018/0115669 A1 | 4/2018 | Ichimaru et al. | |

FOREIGN PATENT DOCUMENTS

| | | |
|---|---|---|
| JP | 5-286611 A | 11/1993 |
| JP | 7-215499 A | 8/1995 |
| JP | 11-20993 A | 1/1999 |
| JP | 11-193141 A | 7/1999 |
| JP | 2012-111565 A | 6/2012 |

(Continued)

*Primary Examiner* — Walter L Lindsay, Jr.
*Assistant Examiner* — Jessica L Eley
(74) *Attorney, Agent, or Firm* — Lewis Roca Rothgerber Christie LLP

(57) ABSTRACT

A medium conveying apparatus includes a plurality of feed rollers spaced in a direction perpendicular to a medium conveying direction, each of the feed rollers rotating independently at a respective speed to feed a medium, a plurality of brake rollers, each of the plurality of brake rollers being located to face a corresponding one of the plurality of feed rollers, a plurality of torque limiters separately provided between one of rotation shafts of the plurality of brake rollers and a corresponding one of the plurality of brake rollers, and a processor to detect a skew of the medium, and correct the skew of the medium by changing the speed of one of the plurality of feed rollers when the skew of the medium is detected.

6 Claims, 17 Drawing Sheets

(56) References Cited

FOREIGN PATENT DOCUMENTS

| | | |
|---|---|---|
| JP | 2013-173620 A | 9/2013 |
| JP | 2013-184819 A | 9/2013 |
| JP | 2013-193837 A | 9/2013 |
| JP | 2018-65685 A | 4/2018 |
| WO | WO 2016/056138 A1 | 4/2016 |

* cited by examiner

MEDIUM CONVEYING APPARATUS FOR CORRECTING A SKEW OF A MEDIUM

CROSS-REFERENCE TO RELATED APPLICATIONS

This application is based upon and claims the benefit of priority of prior Japanese Patent Application No. 2018-238681, filed on Dec. 20, 2018, the entire contents of which are incorporated herein by reference.

TECHNICAL FIELD

Embodiments discussed in the present specification relate to medium conveyance.

BACKGROUND

When conveying and reading a medium in a medium conveying apparatus such as a scanner, a skew (an oblique movement), that is, the medium being conveyed in a tilted manner may be occurred so that the entire medium may not be imaged, or a jam of the medium (paper jam) may occur due to the medium colliding with a side wall of a conveyance path.

A paper feeding device for feeding a document by use of independently driven left and right forward rollers is disclosed (see Japanese Unexamined Patent Publication (Kokai) No. 7-215499). By use of an output from a sensor for detection of the leading edge of a document, the paper feeding device starts left and right motors for driving the left and right forward rollers, respectively, and aligns the leading edge of the document perpendicular to a feeding direction.

SUMMARY

According to some embodiments, a medium conveying apparatus includes a plurality of feed rollers spaced in a direction perpendicular to a medium conveying direction, each of the feed rollers rotating independently at a respective speed to feed a medium, a plurality of brake rollers, each of the plurality of brake rollers being located to face a corresponding one of the plurality of feed rollers, a plurality of torque limiters separately provided between one of rotation shafts of the plurality of brake rollers and a corresponding one of the plurality of brake rollers, and a processor to detect a skew of the medium, and correct the skew of the medium by changing the speed of one of the plurality of feed rollers when the skew of the medium is detected.

According to some embodiments, a method for detecting a skew of a medium includes feeding the medium by a plurality of feed rollers spaced in a direction perpendicular to a medium conveying direction, each of the feed rollers rotating independently at a respective speed to feed the medium, and a plurality of brake rollers, each of the plurality of brake rollers being located to face a corresponding one of the plurality of feed rollers, wherein a plurality of torque limiters separately provided between one of rotation shafts of the plurality of brake rollers and a corresponding one of the plurality of brake rollers, detecting the skew of the medium, and correcting the skew of the medium by changing the speed of one of the plurality of feed rollers when the skew of the medium is detected.

According to some embodiments, a computer program causes a medium conveying apparatus including a plurality of feed rollers spaced in a direction perpendicular to a medium conveying direction, each of the feed rollers rotating independently at a respective speed to feed a medium, a plurality of brake rollers, each of the plurality of brake rollers being located to face a corresponding one of the plurality of feed rollers, a plurality of torque limiters separately provided between one of rotation shafts of the plurality of brake rollers and a corresponding one of the plurality of brake rollers, to execute a process including detecting a skew of the medium, and correcting the skew of the medium by changing the speed of one of the plurality of feed rollers when the skew of the medium is detected.

DESCRIPTION OF EMBODIMENTS

It is to be understood that both the foregoing general description and the following detailed description are exemplary and explanatory, and are not restrictive of the invention, as claimed.

Hereinafter, a medium conveying apparatus, a method and a computer-readable, non-transitory medium storing a computer program according to an embodiment, will be described with reference to the drawings. However, it should be noted that the technical scope of the invention is not limited to these embodiments, and extends to the inventions described in the claims and their equivalents.

Figure 1:
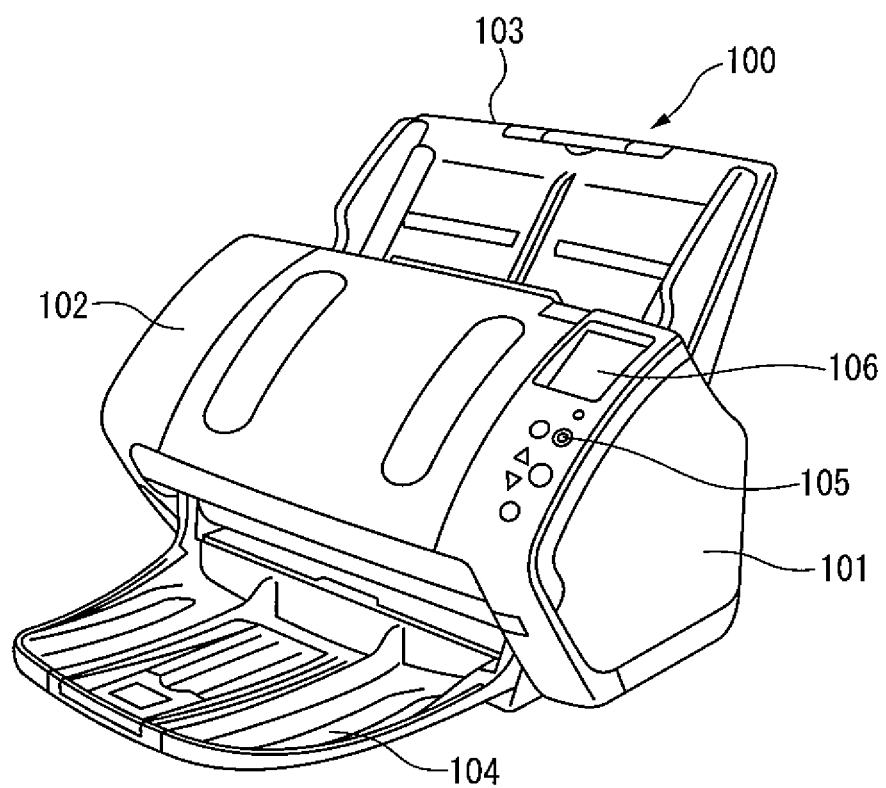
FIG. 1 is a perspective view illustrating a medium conveying apparatus 100 according to an embodiment.

FIG. 1 is a perspective view illustrating a medium conveying apparatus 100 configured as an image scanner. The medium conveying apparatus 100 conveys and images a medium being a document. A medium is paper, thick paper, a card, a brochure, a passport, etc. The medium conveying apparatus 100 may be a fax machine, a copying machine, a multifunctional peripheral (MFP), etc. A conveyed medium may not be a document but may be an object being printed on etc., and the medium conveying apparatus 100 may be a printer etc.

The medium conveying apparatus 100 includes a lower housing 101, an upper housing 102, a medium tray 103, an ejection tray 104, an operation device 105, and a display device 106.

The upper housing 102 is an example of an upper part of a housing, is located in a position covering a top surface of the medium conveying apparatus 100, and is engaged with the lower housing 101 by a hinge in such a way as to be able to open and close in a case of a medium being stuck, cleaning inside the medium conveying apparatus 100, etc.

The medium tray 103 is formed by a resin member and is engaged with the lower housing 101 in such a way as to be able to place a medium to be conveyed. The medium tray 103 is provided in such a way that a placement surface 103a of a medium is tilted against an installation surface of the medium conveying apparatus 100. The ejection tray 104 is engaged with the lower housing 101 in such a way as to be able to hold an ejected medium.

The operation device 105 includes an input device such as a button, and an interface circuit acquiring a signal from the input device, receives an input operation by a user, and outputs an operation signal based on the input operation by the user. The display device 106 includes a display including a liquid crystal or organic electro-luminescence (EL), and an interface circuit for outputting image data to the display, and displays the image data on the display.

Figure 2:
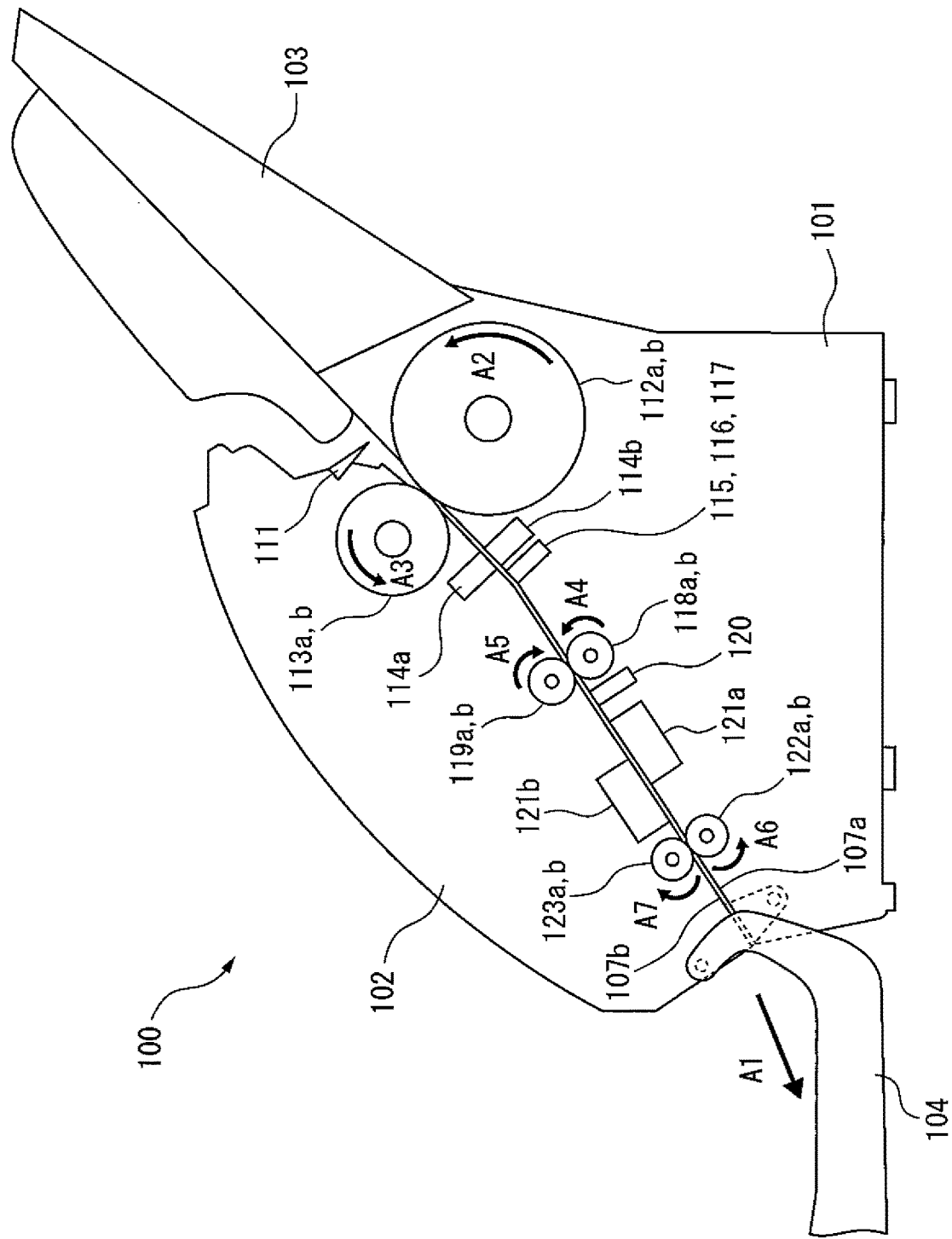
FIG. 2 is a diagram for illustrating a conveyance path inside the medium conveying apparatus 100.

FIG. 2 is a diagram for illustrating a conveyance path inside the medium conveying apparatus 100.

The conveyance path inside the medium conveying apparatus 100 includes a medium detection sensor 111, a plurality of feed rollers 112a and b, a plurality of brake rollers 113a and b, an ultrasonic transmitter 114a, an ultrasonic receiver 114b, a first center sensor 115, a first side sensor 116, a second side sensor 117, a plurality of first conveyance rollers 118a and b, a plurality of second conveyance rollers 119a and b, a second center sensor 120, a first imaging device 121a, a second imaging device 121b, a plurality of third conveyance rollers 122a and b, and a plurality of fourth conveyance rollers 123a and b, etc.

The feed rollers 112a and 112b may be hereinafter collectively referred to as feed rollers 112. Further, the brake rollers 113a and 113b may be collectively referred to as brake rollers 113. Further, the first conveyance rollers 118a and 118b may be collectively referred to as first conveyance rollers 118. Further, the second conveyance rollers 119a and 119b may be collectively referred to as second conveyance rollers 119. Further, the first imaging device 121a and the second imaging device 121b may be collectively referred to as imaging devices 121. Further, the third conveyance rollers 122a and 122b may be collectively referred to as third conveyance rollers 122. Further, the fourth conveyance rollers 123a and 123b may be collectively referred to as fourth conveyance rollers 123.

A top surface of the lower housing 101 forms a lower guide 107a of a conveyance path of a medium, and a bottom surface of the upper housing 102 forms an upper guide 107b of the conveyance path of a medium. An arrow A1 in FIG. 2 indicates a medium conveying direction. An upstream hereinafter refers to an upstream in the medium conveying direction A1, and a downstream refers to a downstream in the medium conveying direction A1.

The medium detection sensor 111 is located on the upstream side of the feed rollers 112 and the brake rollers 113. The medium detection sensor 111 includes a contact detection sensor and detects whether or not a medium is placed on the medium tray 103. The medium detection sensor 111 generates and outputs a medium detection signal changing the signal value between a state in which a medium is placed on the medium tray 103 and a state in which a medium is not placed.

The feed rollers 112 are provided on the lower housing 101 and sequentially feed media placed on the medium tray 103 from the lower side. The brake rollers 113 are provided on the upper housing 102 and each of the plurality of brake rollers 113 is located to face a corresponding one of the feed rollers 112.

The ultrasonic transmitter 114a and the ultrasonic receiver 114b are located on the downstream side of the feed rollers 112 and the brake rollers 113. The ultrasonic transmitter 114a and the ultrasonic receiver 114b are located close to the conveyance path of a medium in such a way as to face one another with the conveyance path in between. The ultrasonic transmitter 114a outputs an ultrasonic wave. On the other hand, the ultrasonic receiver 114b receives an ultrasonic wave being transmitted by the ultrasonic transmitter 114a and passing through a medium, and generates and outputs an ultrasonic signal being an electric signal corresponding to the received ultrasonic wave. The ultrasonic transmitter 114a and the ultrasonic receiver 114b may be hereinafter collectively referred to as an ultrasonic sensor 114.

The first imaging device 121a is an example of an imaging module and includes a reduction optical system type line sensor including an imaging element based on charge coupled devices (CCDs) linearly located in a main scanning direction. Further, the first imaging device 121a includes a lens for forming an image on the imaging element, and an A/D converter for amplifying and analog-digital (A/D) converting an electric signal output from the imaging element. The first imaging device 121a generates and outputs an input image imaging a back side of a conveyed medium, in accordance with control from a processing circuit to be described later.

Similarly, the second imaging device 121b is an example of an imaging module and includes a reduction optical system type line sensor including an imaging element based on CCDs linearly located in the main scanning direction. Further, the second imaging device 121b includes a lens for forming an image on the imaging element, and an A/D converter for amplifying and A/D converting an electric signal output from the imaging element. The second imaging device 121b generates and outputs an input image imaging a front side of a conveyed medium, in accordance with control from a processing circuit to be described later.

Only either of the first imaging device 121a and the second imaging device 121b may be located in the medium conveying apparatus 100 and only one side of a medium may be read. Further, a unity-magnification optical system type contact image sensor (CIS) including an imaging element based on a complementary metal oxide semiconductor (CMOS) may be used in place of the imaging element based on CCDs.

A medium placed on the medium tray 103 is conveyed between the lower guide 107a and the upper guide 107b in the medium conveying direction A1 by the feed rollers 112 rotating in a direction of an arrow A2 in FIG. 2, that is, a medium feeding direction. When a medium is conveyed, the brake rollers 113 rotate in a direction of an arrow A3, that is, a direction opposite to the medium feeding direction. By the workings of the feed rollers 112 and the brake rollers 113, when a plurality of media are placed on the medium tray 103, only a medium in contact with the feed rollers 112, out of the media placed on the medium tray 103, is separated. Consequently, the medium conveying apparatus 100 operates in such a way that conveyance of a medium other than the separated medium is restricted (prevention of media multi-feed). A medium is fed between the first conveyance rollers 118 and the second conveyance rollers 119 while being guided by the lower guide 107a and the upper guide 107b. The medium is fed between the first imaging device 121a and the second imaging device 121b by the first conveyance rollers 118 and the second conveyance rollers 119 rotating in directions of an arrow A4 and an arrow A5, respectively. The medium read by the imaging devices 121 is ejected on the ejection tray 104 by the third conveyance rollers 122 and the fourth conveyance rollers 123 rotating in directions of an arrow A6 and an arrow A7, respectively.

Figure 3:
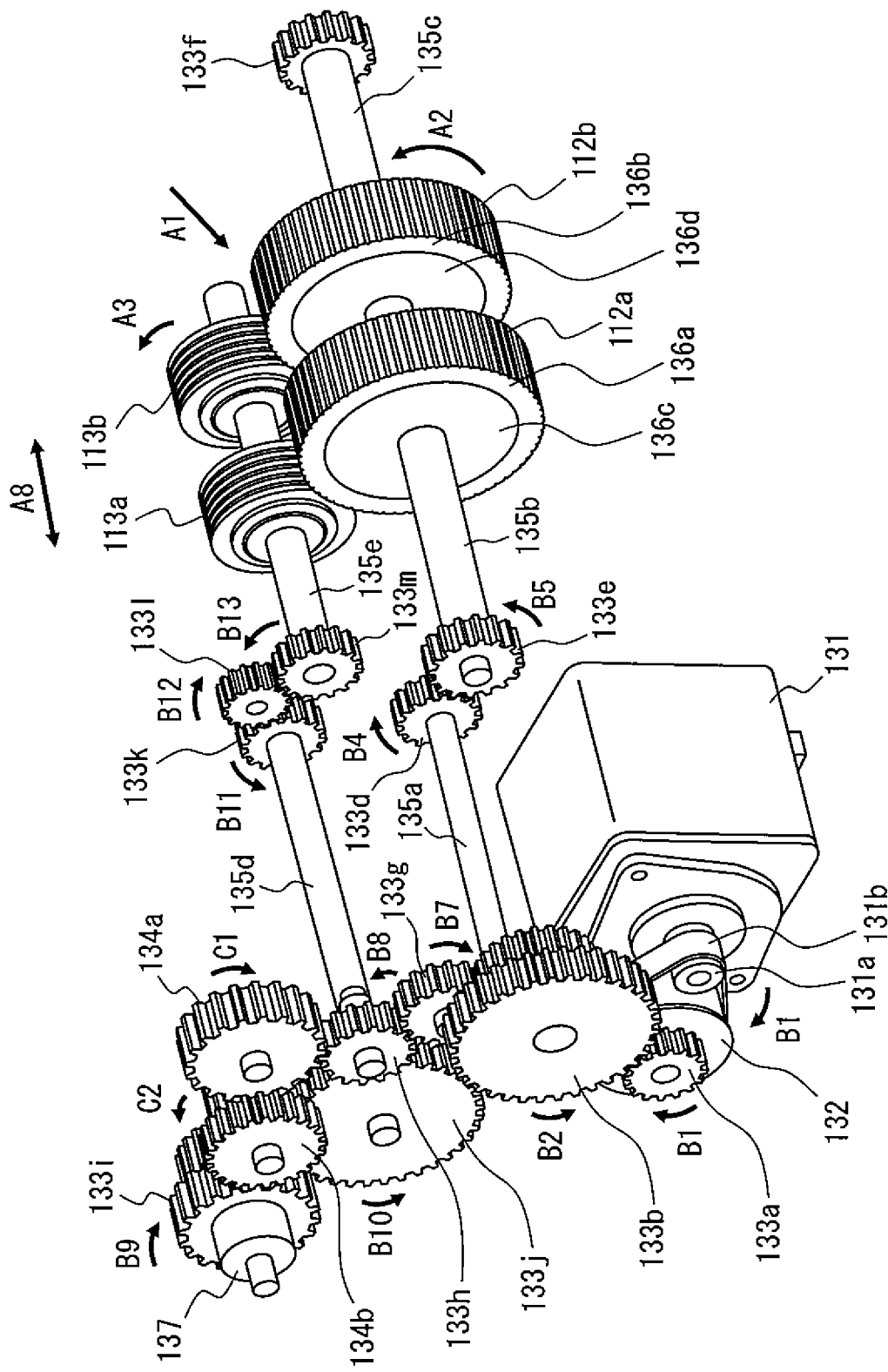
FIG. 3 is a schematic diagram for illustrating a driving mechanism in the medium conveying apparatus 100.
Figure 4:
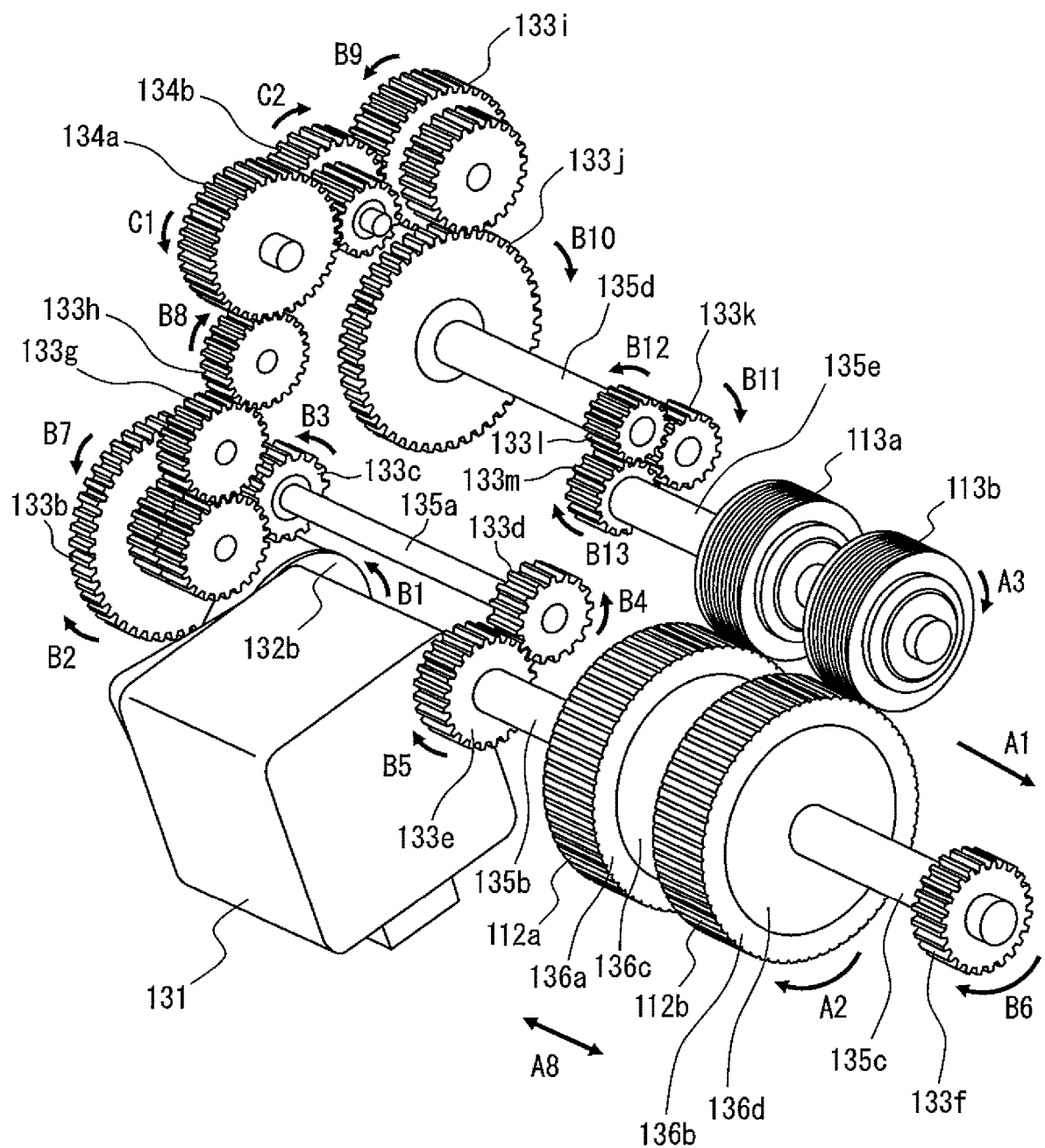
FIG. 4 is a schematic diagram for illustrating the driving mechanism in the medium conveying apparatus 100.

FIG. 3 and FIG. 4 are schematic diagrams for illustrating a driving mechanism in the medium conveying apparatus 100. FIG. 3 is a schematic diagram of the driving mechanism in the medium conveying apparatus 100 viewed from an upstream side of the medium conveying direction A1 and also from one end of a direction A8 perpendicular to the medium conveying direction. FIG. 4 is a schematic diagram of the driving mechanism in the medium conveying apparatus 100 viewed from an upstream side of the medium conveying direction A1 and also from the other end of the direction A8 perpendicular to the medium conveying direction.

As illustrated in FIG. 3 and FIG. 4, the driving mechanism in the medium conveying apparatus 100 includes a first motor 131, a pulley 132, first to thirteenth gears 133a to m, a sun gear 134a, a planetary gear 134b, and first to fifth shafts 135a to e, in addition to the aforementioned feed rollers 112 and the brake rollers 113.

The plurality of feed rollers 112a and b are spaced and located alongside in the direction A8 perpendicular to the medium conveying direction. On the other hand, the plurality of brake rollers 113a and b are located in such a way as to face the plurality of feed rollers 112a and b, respectively. The feed rollers 112a and b are provided with outer peripheral surfaces 136a and b, one-way clutches 136c and d, etc., respectively. The one-way clutches 136c and d prevent the respective outer peripheral surfaces 136a and b of the feed rollers 112a and b from rotating in a direction opposite to the medium feeding direction A2 with respect to respective rotation axis of the feed rollers 112a and b.

The first conveyance rollers 118 and the second conveyance rollers 119 convey a medium at a conveyance speed faster than a feed speed of the feed rollers 112. Accordingly, when a medium reaches a position of the first conveyance rollers 118 and the second conveyance rollers 119, the medium is pulled by the first conveyance rollers 118 and the second conveyance rollers 119 while being clamped by the feed rollers 112 and the brake rollers 113. At this time, the outer peripheral surfaces 136a and b of the feed rollers 112 rotate according to the clamped medium by the workings of the one-way clutches 136c and d, and therefore do not hamper conveyance of the medium.

A rotation axis (an axis member) of the ninth gear 133i is provided with a first torque limiter 137. A torque limit value of the first torque limiter 137 is a first limit value. The first motor 131 includes a rotation axis 131a (an axis member) and generates a driving force for rotating the feed rollers 112 and the brake rollers 113 through the rotation axis 131a.

A belt 131b is stretched between the rotation axis 131a of the first motor 131 and the pulley 132, and the first gear 133a is mounted on a rotation axis (an axis member) of the pulley 132. The first gear 133a is engaged with a gear part of the second gear 133b with a larger outer diameter, and a gear part of the second gear 133b with a smaller outer diameter is engaged with the third gear 133c. The third gear 133c is mounted at one end of the first shaft 135a, and the fourth gear 133d is mounted at the other end of the first shaft 135a. The fourth gear 133d is engaged with the fifth gear 133e. The fifth gear 133e is mounted at one end of the second shaft 135b, and the feed roller 112a is mounted at the other end of the second shaft 135b in such a way as to rotate according to rotation of the second shaft 135b. The second shaft 135b is an example a rotation axis of the feed roller 112a.

On the other hand, the sixth gear 133f is connected to a second motor (unillustrated) through a predetermined driving mechanism. The sixth gear 133f is mounted at one end of the third shaft 135c, and the feed roller 112b is mounted at the other end of the third shaft 135c in such a way as to rotate according to rotation of the third shaft 135c. The third shaft 135c is an example of a rotation axis of the feed roller 112b. Thus, the feed rollers 112a and b are provided in such a way as to rotate independently at a respective circumferential speed to feed a medium by separate motors, respectively. The feed rollers 112a and b may be provided in such a way as to rotate integrally by a common motor.

Further, the gear part of the second gear 133b with the smaller outer diameter is further engaged with the seventh gear 133g, and the seventh gear 133g is engaged with the eighth gear 133h. The eighth gear 133h is engaged with the sun gear 134a, and the sun gear 134a is engaged with a gear part of the planetary gear 134b with a smaller outer diameter. A gear part of the planetary gear 134b with a larger outer diameter is engaged with a gear part of the ninth gear 133i with a larger outer diameter, and a gear part of the ninth gear 133i with a smaller outer diameter is engaged with the tenth gear 133j. The tenth gear 133j is mounted at one end of the fourth shaft 135d, and the eleventh gear 133k is mounted at the other end of the fourth shaft 135d. The eleventh gear 133k is engaged with the twelfth gear 133l, and the twelfth gear 133l is engaged with the thirteenth gear 133m. The thirteenth gear 133m is mounted at one end of the fifth shaft 135e, and the brake rollers 113a and b are mounted at the other end of the fifth shaft 135e in such a way as to rotate according to rotation of the fifth shaft 135e. The fifth shaft 135e is an example of a rotation axis of the brake rollers 113a and b.

The first motor 131 generates a first driving force by rotation in a first direction and also generates a second driving force by rotation in a second direction opposite to the first direction, as driving forces. Rotation in the first direction refers to rotation of rotating the rotation axis 131a in a direction of an arrow B1, and rotation in the second direction refers to rotation of rotating the rotation axis 131a in a direction opposite to the arrow B1. Similarly, the second motor connected to the sixth gear 133f generates the first driving force by rotation in the first direction and generates the second driving force by rotation in the second direction opposite to the first direction, as driving forces.

When the first motor 131 generates the first driving force, the rotation axis 131a rotates in the direction of the arrow B1, and the first to fifth gears 133a to e accordingly rotate in directions of arrows B1 to B5, respectively. Consequently, the feed roller 112a rotates in the medium feeding direction A2. Further, when the second motor generates the first driving force, the feed roller 112b rotates in the medium feeding direction A2 by the sixth gear 133f rotating in a direction of an arrow B6. On the other hand, according to rotation of the second gear 133b in the direction of the arrow B2, the seventh and eighth gears 133g and h, the sun gear 134a, the planetary gear 134b, and the ninth to thirteenth gears 133i to m rotate in directions of arrows B7 to B8, C1 to C2, and B9 to B13, respectively. Consequently, the brake rollers 113a and b rotate in the direction A3 opposite to the medium feeding direction.

On the other hand, when the first motor 131 generates the second driving force, the rotation axis 131a rotates in the direction opposite to the arrow B1, and the first to fifth gears 133a to e accordingly rotate in the directions opposite to the arrows B1 to B5, respectively. Consequently, the second shaft 135b rotates in the direction opposite to the medium feeding direction A2. However, the feed roller 112a is provided with the one-way clutch 136c preventing the outer peripheral surface 136a from rotating in the direction opposite to the medium feeding direction A2 with respect to the second shaft 135b. By the working of the one-way clutch 136c, the outer peripheral surface 136a of the feed roller 112a does not rotate, according to the second driving force, in the direction opposite to the arrow A2.

Similarly, when the second motor generates the second driving force, the third shaft 135c rotates in the direction opposite to the arrow A2 by the sixth gear 133f rotating in a direction opposite to the arrow B6. However, the feed roller 112b is provided with the one-way clutch 136d preventing the outer peripheral surface 136b from rotating in the direction opposite to the medium feeding direction A2 with respect to the third shaft 135c. By the working of the one-way clutch 136d, the outer peripheral surface 136b of the feed roller 112b does not rotate, according to the second driving force, in the direction opposite to the arrow A2. Movements of the brake rollers 113a and b when the first motor 131 generates the second driving force will be described below.

Figure 5:
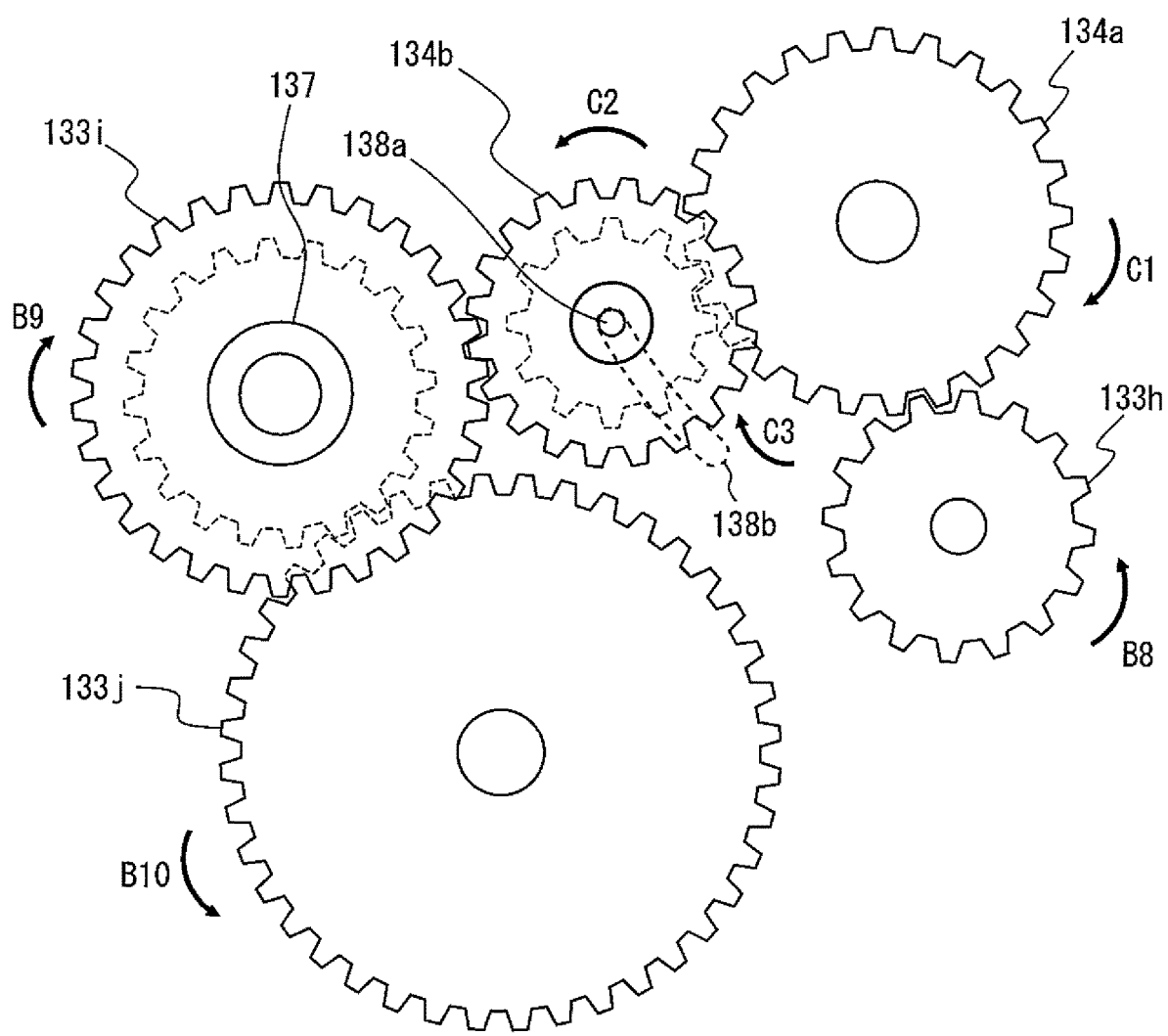
FIG. 5 is a schematic diagram for illustrating operations of a planetary gear 134$b$ etc.
Figure 6:
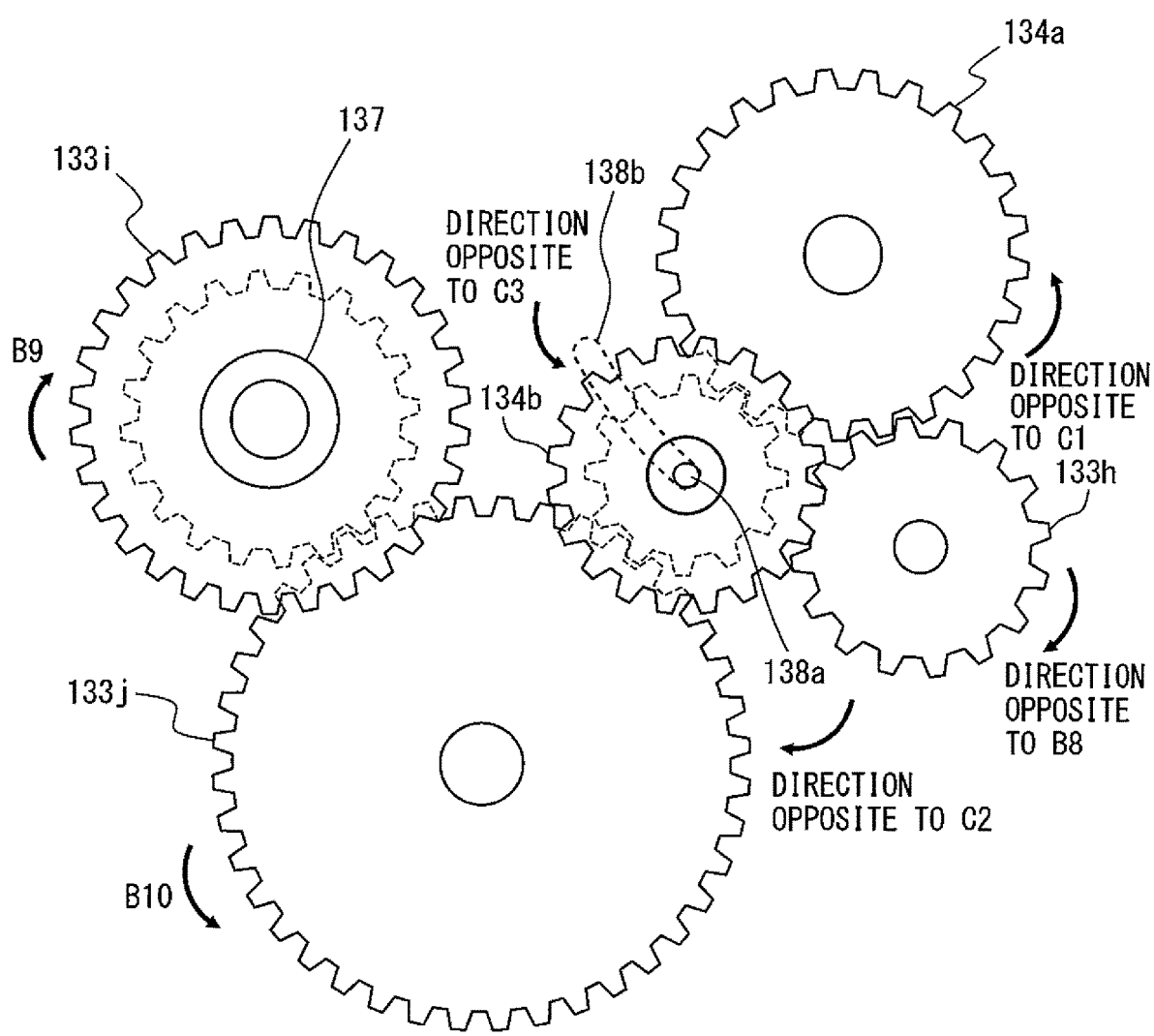
FIG. 6 is a schematic diagram for illustrating operations of the planetary gear 134$b$ etc.

FIG. 5 and FIG. 6 are schematic diagrams for illustrating operations of the sun gear 134a and the planetary gear 134b. FIG. 5 illustrates a state of the sun gear 134a and the planetary gear 134b when the first motor 131 generates the first driving force, and FIG. 6 illustrates a state of the sun gear 134a and the planetary gear 134b when the first motor 131 generates the second driving force.

As illustrated in FIG. 5 and FIG. 6, a rotation axis 138a (an axis member) of the planetary gear 134b is provided to be movable along a groove part 138b formed on the upper housing 102. As illustrated in FIG. 5, when the first motor 131 generates the first driving force, the sun gear 134a rotates in the direction of the arrow C1 by the first to eighth gears 133a to h rotating in the directions of the arrows B1 to B8, respectively. According to the rotation of the sun gear 134a in the direction of the arrow C1, the planetary gear 134b engaged with the sun gear 134a moves (revolves) to an upper-left end position of the groove part 138b along the groove part 138b in a direction of an arrow C3 and engages with the ninth gear 133i. The planetary gear 134b further rotates in the direction of the arrow C2 at the upper-left end position of the groove part 138b, according to the rotation of the sun gear 134a. Consequently, as illustrated in FIG. 3 and FIG. 4, the ninth to thirteenth gears 133i to m rotate in the directions of the arrows B9 to B13, respectively, and the brake rollers 113a and b rotate in the direction of the arrow A3.

On the other hand, when the first motor 131 generates the second driving force as illustrated in FIG. 6, the sun gear 134a rotates in a direction opposite to the arrow C1 by the first to eighth gears 133a to h rotating in directions opposite to the arrows B1 to B8, respectively. According to the rotation of the sun gear 134a in the direction opposite to the arrow C1, the planetary gear 134b moves (revolves) to a lower-right end position of the groove part 138b along the groove part 138b in a direction opposite to the arrow C3, separates from the ninth gear 133i, and engages with the tenth gear 133j. The planetary gear 134b further rotates in a direction opposite to the arrow C2 at the lower-right end position of the groove part 138b, according to the rotation of the sun gear 134a. Consequently, the tenth to thirteenth gears 133j to m rotate in the directions of the arrows B10 to B13, respectively, and the brake rollers 113a and b rotate in the direction of the arrow A3.

Thus, the first driving force by the first motor 131 is transmitted to the brake rollers 113a and b through the ninth gear 133i, that is, through the first torque limiter 137 provided on a rotation axis of the ninth gear 133i. On the other hand, the second driving force is transmitted to the brake rollers 113a and b, bypassing the ninth gear 133i, that is, bypassing the first torque limiter 137.

Figure 7:
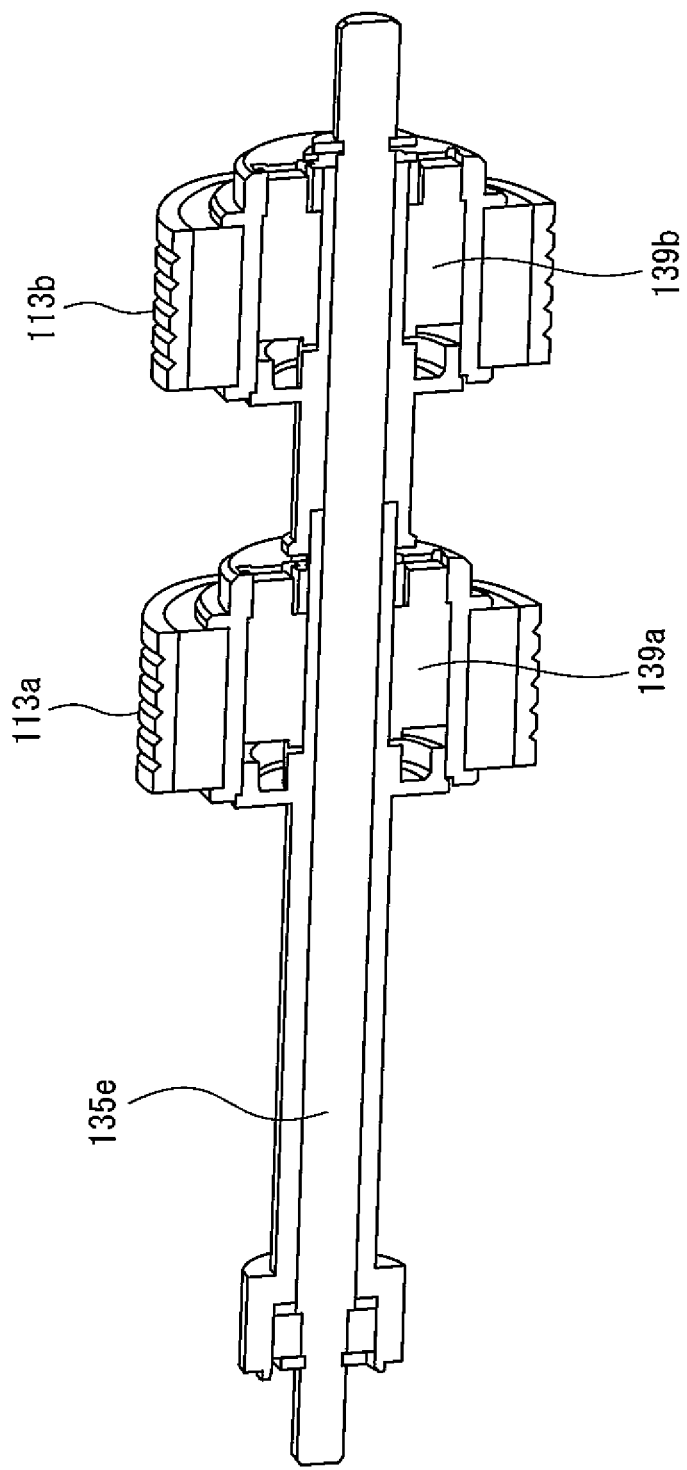
FIG. 7 is a schematic diagram for illustrating second torque limiters 139$a$ and $b$.

FIG. 7 is a schematic diagram for illustrating second torque limiters 139a and b provided on the brake rollers 113a and b.

As illustrated in FIG. 7, a plurality of second torque limiters 139a and b are separately provided between a corresponding one of the fifth shaft 135e being the rotation axis of the brake rollers 113 and a corresponding one of the brake rollers 113a and b, respectively. In other words, the second torque limiters 139a and b are provided correspondingly to the brake rollers 113a and b, respectively. A torque limit value of each of the second torque limiters 139a and b is less than the first limit value and the total of the torque limit values of the second torque limiters 139a and b is equal to a second limit value greater than the first limit value. For example, the first limit value is set to 500 gf. cm, the second limit value is set to 700 gf. cm, and the torque limit value of each of the second torque limiters 139a and b is set to 350 gf. cm.

A common second torque limiter may be provided for the brake rollers 113a and b instead of separate second torque limiters 139a and b being provided for the brake rollers 113a and b, respectively.

The belt 131b, the pulley 132, the first to second, and eighth to thirteenth gears 133a to b, and h to m, the sun gear 134a, the planetary gear 134b, and the fourth and fifth shafts 135d and e illustrated in FIG. 3 and FIG. 4, constitute an example of a first transmission mechanism. The first transmission mechanism transmits the first driving force from the first motor 131 to the brake rollers 113 through the first torque limiter 137 and rotates the brake rollers 113 in the direction A3 opposite to the medium feeding direction.

On the other hand, the belt 131b, the pulley 132, the first to second, eighth, and tenth to thirteenth gears 133a to b, h, and j to m, the sun gear 134a, the planetary gear 134b, and the fourth and fifth shafts 135d and e constitute an example of a second transmission mechanism. The second transmission mechanism does not include the ninth gear 133i provided with the first torque limiter 137. The second transmission mechanism transmits the first driving force from the first motor 131 to the brake rollers 113 through the second torque limiters 139a and b, bypassing the first torque limiter 137, and rotates the brake rollers 113 in the direction A3 opposite to the medium feeding direction.

As described above, the first transmission mechanism and the second transmission mechanism include the planetary gear 134b. The first transmission mechanism transmits the first driving force to the brake rollers 113 through the first torque limiter 137 and through the planetary gear 134b. The second transmission mechanism transmits the second driving force to the brake rollers 113, bypassing the first torque limiter 137, by the coupling of the planetary gear 134b being changed according to switching from the first driving force to the second driving force.

Regardless of which of the first transmission mechanism and the second transmission mechanism is used, each driving force is transmitted to the brake rollers 113 through the second torque limiters 139a and b. However, the torque limit value (the first limit value) of the first torque limiter 137 is less than the total of the torque limit values (the second limit value) of the second torque limiters 139a and b. Accordingly, the total torque limit value of the first transmission mechanism going through both the first torque limiter 137 and the second torque limiters 139a and b becomes the first limit value. On the other hand, the total torque limit value of the second transmission mechanism going through only the second torque limiters 139a and b and bypassing the first torque limiter 137 becomes the second limit value. In other words, while the brake rollers 113 rotate in the direction A3 opposite to the medium feeding direction regardless of whether being driven by the first driving force or the second driving force, the torque limit value in the case of being driven by the second driving force is greater than the torque limit value in the case of being driven by the first driving force.

The first limit value is set to a value by which a turning force through the first torque limiter 137 is cut off when there is one medium, and a turning force through the first torque limiter 137 is transmitted when there are a plurality of media. Consequently, when only one medium is conveyed, the brake rollers 113 do not rotate according to the first driving force and are driven by the feed rollers 112. On the other hand, when a plurality of media are conveyed, the brake rollers 113 prevents occurrence of media multi-feed by rotating in the direction A3 opposite to the medium feeding direction and separating a medium in contact with the feed rollers 112 from the other media. At this time, the outer peripheral surfaces of the brake rollers 113 may be apply a force in the direction A3 opposite to the medium feeding direction to the media in a state in which the outer peripheral surfaces are not rotating in the direction A3 opposite to the medium feeding direction and are stopped.

On the other hand, the second limit value is set to a value by which a turning force through the second torque limiters 139a and b is transmitted even when there are a plurality of media. Accordingly, when the first motor 131 generates the second driving force, the brake rollers 113 rotate in the direction A3 opposite to the medium feeding direction according to the second driving force, reset a medium existing between the brake rollers 113 and the feed rollers 112 to the medium tray 103, and restore the medium.

Figure 8:
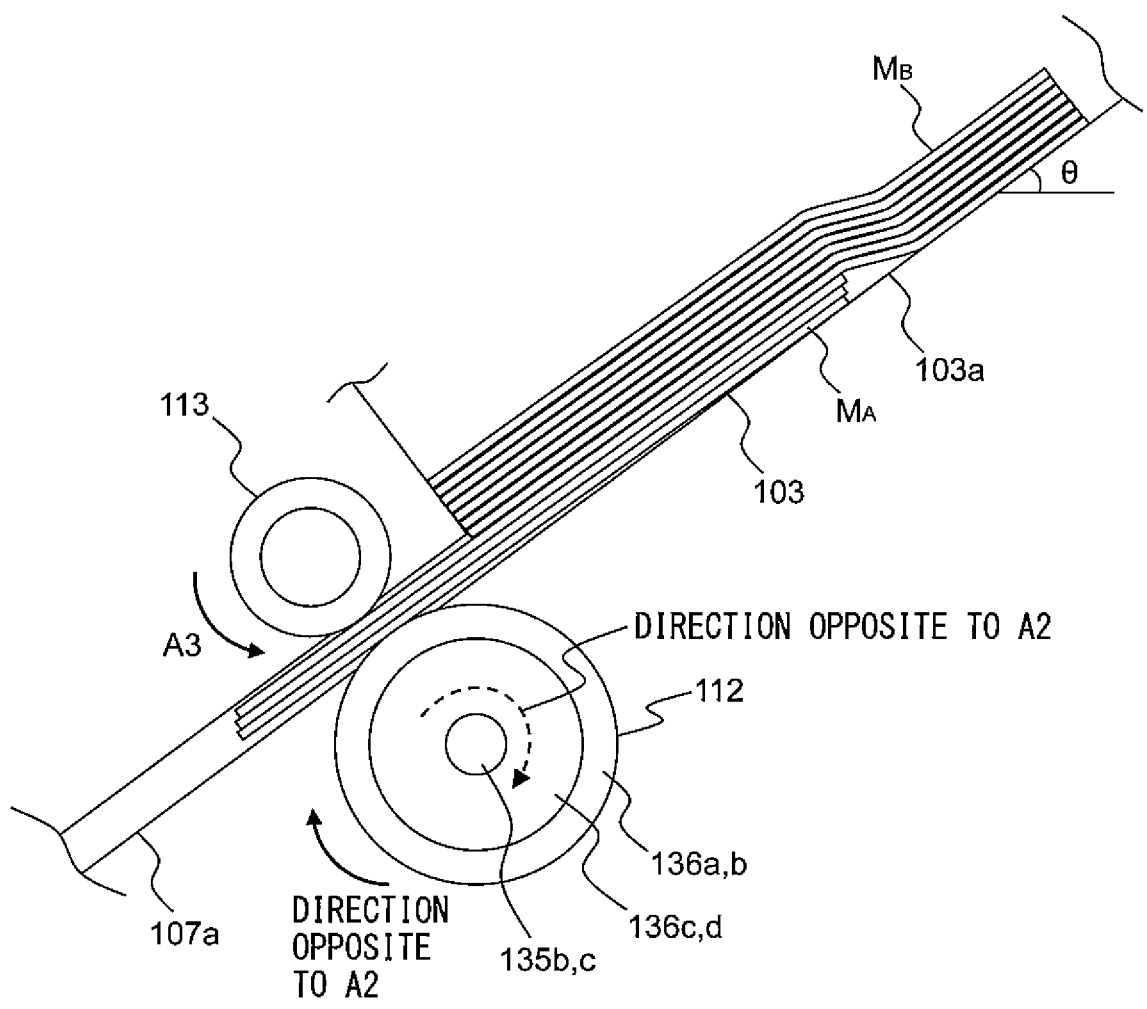
FIG. 8 is a schematic diagram for illustrating movements of a feed roller 112 etc.

FIG. 8 is a schematic diagram for illustrating movements of the feed rollers 112 and the brake rollers 113 when the first motor 131 generates the second driving force.

As described above, when the first motor 131 generates the second driving force, the brake rollers 113 rotate in the direction A3 opposite to the medium feeding direction. At this time, the limit value of torque applied to the brake roller 113 is set in such a way that a turning force is transmitted even when a plurality of media are fed. On the other hand, when the first motor 131 and the second motor generate the second driving force, the second shaft 135b and the third shaft 135c being the respective rotation axes of the feed rollers 112a and b rotate in the direction opposite to the medium feeding direction A2. However, the respective outer peripheral surfaces 136a and b of the feed rollers 112a and b do not rotate in the direction opposite to the arrow A2 according to the second driving force, due to the workings of the one-way clutches 136c and d. Accordingly, the respective outer peripheral surfaces 136a and b of the feed rollers 112a and b rotate in the direction opposite to the medium feeding direction A2 driven by the brake rollers 113a and b, respectively.

The second shaft 135b and the third shaft 135c being the respective rotation axes of the feed rollers 112a and b are provided in such a way as to rotate at a rotation speed faster than a rotation speed of the respective outer peripheral surfaces 136a and b of the feed rollers 112a and b driven to rotate by the brake rollers 113. Consequently, the respective outer peripheral surfaces 136a and b of the feed rollers 112a and b rotate according to rotation of the outer peripheral surfaces of the brake rollers 113 without being hampered by the one-way clutches 136c and d. Thus, the feed rollers 112 are driven to rotate in the direction opposite to the medium feeding direction A2 by the brake rollers 113. Further, the brake rollers 113 rotate in the direction A3 opposite to the medium feeding direction without receiving a load from the feed rollers 112.

Accordingly, even when a plurality of media $M_A$ are multi-fed between the brake rollers 113 and the feed rollers 112, the medium conveying apparatus 100 can reset all of the plurality of media $M_A$ to the medium tray 103 by generating the second driving force by the first motor 131. Particularly, the medium conveying apparatus 100 can restore a medium without adding a torque control device such as a hysteresis brake and can suppress increase in cost, size, and power consumption of the device.

The medium tray 103 in the medium conveying apparatus 100 is provided in such a way that a placement surface 103a of a medium is tilted against an installation surface of the medium conveying apparatus 100 by a predetermined angle θ, and the medium conveying apparatus 100 sequentially feeds media from the lower side by use of self weights of media placed on the medium tray 103. When media multi-feed occurs in the so-called bottom-first type medium conveying apparatus 100, other media $M_B$ may be loaded on multi-fed media $M_A$ on the medium tray 103. Accordingly, when the multi-fed media $M_A$ are reset to the medium tray 103, a frictional load is generated between the multi-fed media $M_A$ and the media $M_B$ remaining on the medium tray 103. By making a limit value of torque applied to the brake roller 113 when the multi-fed media $M_A$ are reset to the medium tray 103 greater than the limit value when feeding a medium, the medium conveying apparatus 100 can satisfactorily reset the multi-fed media $M_A$ even when the other media $M_B$ are loaded on the media $M_A$.

Assuming that a medium conveying apparatus stops feed rollers and resets only other multi-fed media to a medium tray while keeping a medium in contact with the feed rollers at the position, a frictional load is also generated between the medium in contact with the feed roller and the other multi-fed media. On the other hand, the medium conveying apparatus 100 according to the present embodiment causes the feed rollers 112 to be driven by the brake rollers 113 and resets all multi-fed media $M_A$ to the medium tray 103. Consequently, a frictional load is not generated between a medium in contact with the feed rollers 112 and other multi-fed media, and instead, a frictional load is generated between the fed medium $M_A$ and the placement surface 103a of the medium tray 103. However, the medium tray 103 is formed by a resin member, and a frictional load generated between a medium such as paper and the placement surface 103a is sufficiently smaller than a frictional load generated between two media (approximately ⅔). Accordingly, compared with the case of resetting only other multi-fed media to the medium tray while keeping a medium in contact with the feed roller at the position, the medium conveying apparatus 100 can reset the medium to the medium tray 103 with a smaller force.

Further, when a plurality of media with different sizes are placed on the medium tray 103, a medium with a smaller size may be buried under a medium with a larger size, and the media may be conveyed without respective front edges of the media being aligned. Particularly, when a medium placed on the upper side precedes a medium placed on the lower side, the medium placed on the upper side may pass between the feed rollers 112 and the brake rollers 113 before the medium placed on the lower side, and media multi-feed may occur. The medium conveying apparatus 100 resets multi-fed media by driving the brake rollers 113 located on the upper side and therefore resets the medium placed on the upper side to the medium tray 103 side more firmly than the medium placed on the lower side. Consequently, the medium conveying apparatus 100 can reduce misalignment of front edges of the media reset to the medium tray 103 and reduce a possibility of occurrence of the media multi-feed at the time of refeed.

Further, a limit value is also set to torque applied to the brake rollers 113 in the medium conveying apparatus 100 when multi-fed media $M_A$ are reset to the medium tray 103. Accordingly, for example, when a weight of media remaining on the medium tray 103 is so heavy that multi-fed media cannot be satisfactorily reset to the medium tray 103, the medium conveying apparatus 100 does not forcibly restore the media. Consequently, the medium conveying apparatus 100 can prevent occurrence of damage to a medium.

Figure 9:
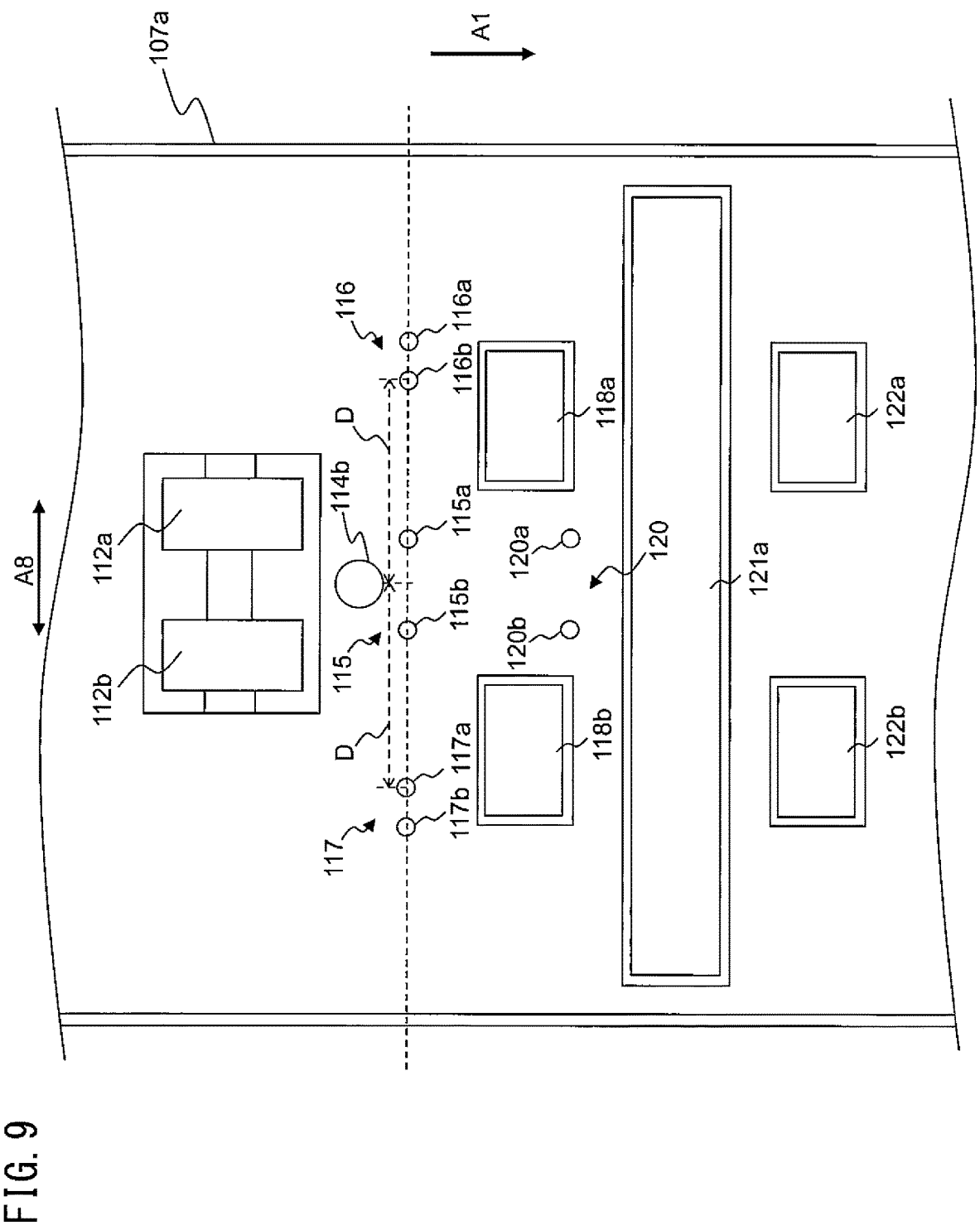
FIG. 9 is a schematic diagram for illustrating each sensor.

FIG. 9 is a schematic diagram for illustrating the first center sensor 115, the first side sensor 116, the second side sensor 117, and the second center sensor 120. FIG. 9 is a schematic diagram of the lower housing 101 viewed from above in a state in which the upper housing 102 is removed.

As illustrated in FIG. 9, the first center sensor 115 is located at an almost central part in the direction A8 perpendicular to the medium conveying direction A1, on the downstream side of the ultrasonic sensor 114 and on the upstream side of the first conveyance rollers 118 and the second conveyance rollers 119 in the medium conveying direction. The first center sensor 115 includes a first center light emitter 115a and a first center light receiver 115b provided on one side (the lower housing 101) of a medium conveyance path. Further, the first center sensor 115 includes a first center reflection member (unillustrated), such as a mirror, provided at a position (the upper housing 102) facing the first center light emitter 115a and the first center light receiver 115b with the medium conveyance path in between. The first center light emitter 115a emits light toward the medium conveyance path. On the other hand, the first center light receiver 115b receives light emitted by the first center light emitter 115a and reflected by the first center reflection member, and generates and outputs a first center signal being an electric signal based on intensity of the received light.

The first side sensor 116 and the second side sensor 117 are located at almost the same position as the first center sensor 115 in the medium conveying direction A1, outside the first center sensor 115, that is, on a side of the first center sensor 115 in the direction A8 perpendicular to the medium conveying direction. The first and second side sensors 116 and 117 include first and second side light emitters 116a and 117a, and first and second side light receivers 116b and 117b each of which is provided on one side (the lower housing 101) of the medium conveyance path. Further, the first and second side sensors 116 and 117 respectively include first and second side reflection members (unillustrated), such as mirrors, provided at a position (the upper housing 102) facing the respective side light emitters and the respective side light receivers with the medium conveyance path in between. The first and second side light emitters 116a and 117a emit light toward the medium conveyance path. On the other hand, the first and second side light receivers 116b and 117b receive light emitted by the first and second side light emitters 116a and 117a and reflected by the first and second side reflection members, respectively, and generate and output first and second side signals being electric signals based on intensity of the received light, respectively.

The second center sensor 120 is located on the downstream side of the first conveyance rollers 118 and the second conveyance rollers 119 and on the upstream side of the imaging devices 121 in the medium conveying direction A1, and on an almost central part in the direction A8 perpendicular to the medium conveying direction. The second center sensor 120 includes a second center light emitter 120a and a second center light receiver 120b provided on one side (the lower housing 101) of the medium conveyance path. Further, the second center sensor 120 includes a second center reflection member (unillustrated), such as a mirror, provided at a position (the upper housing 102) facing the second center light emitter 120a and the second center light receiver 120b with the medium conveyance path in between. The second center light emitter 120a emits light toward the medium conveyance path. On the other hand, the second center light receiver 120b receives light emitted by the second center light emitter 120a and reflected by the second center reflection member, and generates and outputs a second center signal being an electric signal based on intensity of the received light.

When a medium exists at each position of the first center sensor 115, the first side sensor 116, the second side sensor 117, and the second center sensor 120, light emitted by the light emitter in each sensor is shaded by the medium. Accordingly, a signal value of a signal generated by each sensor varies between a state in which a medium exists at a position of each sensor and a state in which a medium does not exist. Consequently, each of the first center sensor 115, the first side sensor 116, the second side sensor 117, and the second center sensor 120 detects whether or not a medium exists at the position. The light emitter and the light receiver in each sensor may be provided in positions facing one another with the conveyance path in between, and the reflection member may be omitted.

The first center sensor 115, the first side sensor 116, and the second side sensor 117 are used for detecting a skew being an oblique movement of a medium. As arrangement positions of the first side sensor 116 and the second side sensor 117 become closer to the center, a skew of a smaller sized medium can be detected. However, as the arrangement positions of the first side sensor 116 and the second side sensor 117 become closer to the center, a timing of the front edge of a tilted medium passing the first side sensor 116 or the second side sensor 117 becomes later, and a detection timing of a skew becomes later. Further, as the arrangement positions of the first side sensor 116 and the second side sensor 117 become closer to the center, a distance between the first side sensor 116 or the second side sensor 117, and the first center sensor 115 becomes shorter, and detection precision of a skew becomes lower. On the other hand, as the arrangement positions of the first side sensor 116 and the second side sensor 117 become closer to the outside, a detection timing of a skew becomes earlier, and also detection precision of a skew becomes higher; however, a skew of a smaller sized medium is not detected.

In general, a skew of a medium is likely to occur in a medium conveying apparatus supporting an A4 sheet or larger, when an A5 sheet is conveyed in a longitudinal direction or an A6 sheet is conveyed in a lateral direction. Accordingly, it is preferable that a distance D from the center position of the medium conveyance path to the first side sensor 116 and the second side sensor 117 in the direction A8 perpendicular to the medium conveying direction be less than or equal to ½ of a length of an A5 sheet in a widthwise direction (148 mm) or a length of an A6 sheet in a lengthwise direction. For example, it is preferable that the distance D from the center position of the medium conveyance path to the first side sensor 116 and the second side sensor 117 in the direction A8 perpendicular to the medium conveying direction be greater than or equal to 25 mm and less than or equal to 75 mm considering a margin.

Thus, the first center sensor 115, the first side sensor 116, and the second side sensor 117 are located on the downstream side of the feed rollers 112 and the upstream side of the first conveyance rollers 118 and the second conveyance rollers 119. Consequently, the medium conveying apparatus 100 can detect a skew of a medium before the medium reaches the positions of the first conveyance rollers 118 and the second conveyance rollers 119, and can correct the skew of the medium by use of the feed rollers 112. Further, the first center sensor 115, the first side sensor 116, and the second side sensor 117 are spaced and located alongside in the direction A8 perpendicular to the medium conveying direction A1, on the downstream side of the feed rollers 112 in the medium conveying direction. Two sensors out of the first center sensor 115, the first side sensor 116, and the second side sensor 117 are examples of two sensors spaced in the direction A8 perpendicular to the medium conveying direction A1 on the downstream side of the feed roller 112 in the medium conveying direction.

Figure 10:
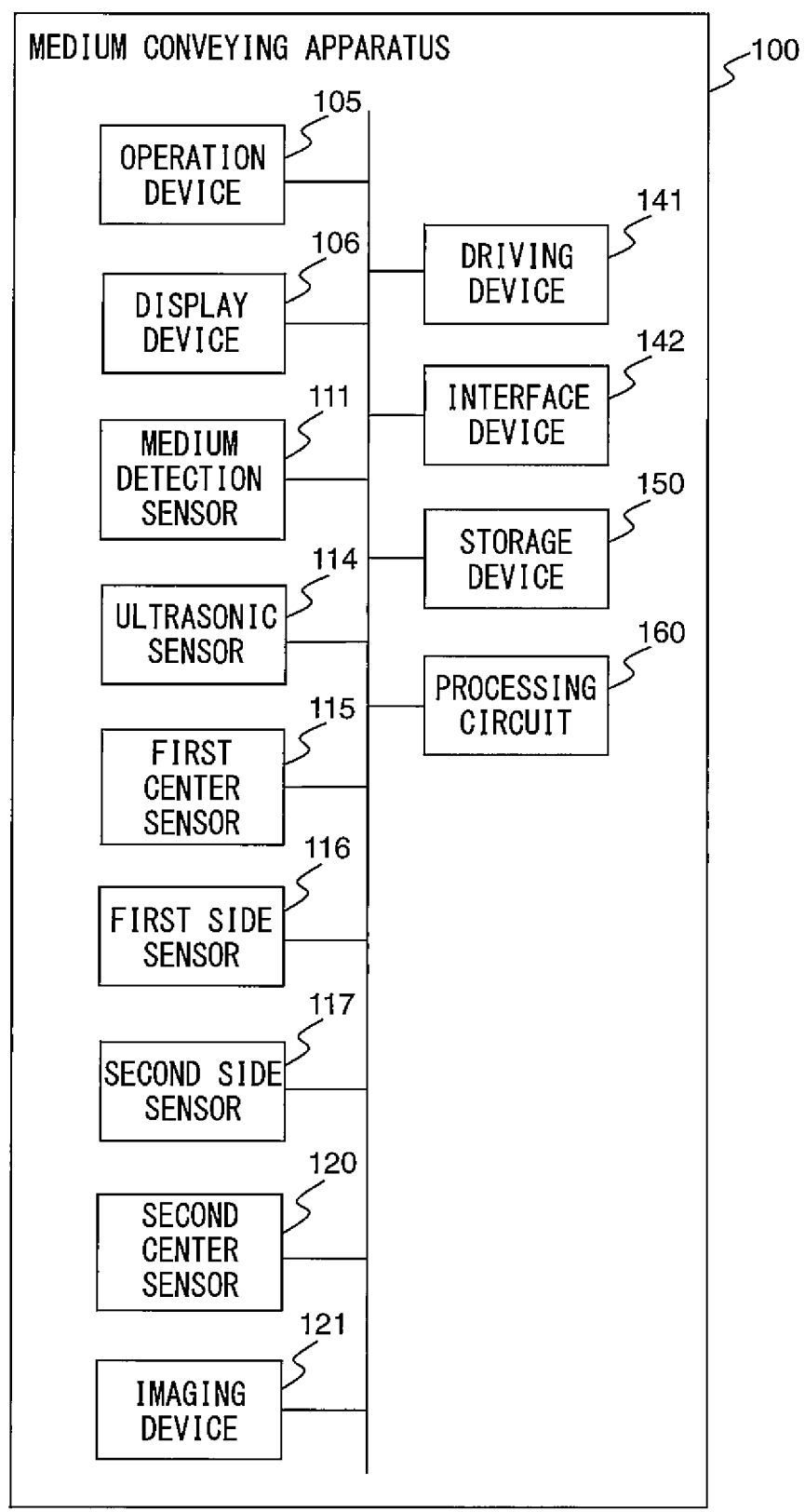
FIG. 10 is a block diagram illustrating a schematic configuration of the medium conveying apparatus 100.

FIG. 10 is a block diagram illustrating a schematic configuration of the medium conveying apparatus 100.

The medium conveying apparatus 100 further includes a driving device 141, an interface device 142, a storage device 150, and a processing circuit 160, etc., in addition to the configuration described above.

The driving device 141 is an example of a driving force generation module and generates the first driving force and the second driving force. The driving device 141 includes a plurality of motors including the first motor 131 and the second motor, and conveys a medium by rotating the feed rollers 112, the brake rollers 113, and the first to fourth conveyance rollers 118, 119, 122, and 123, by a control signal from the processing circuit 160.

For example, the interface device 142 includes an interface circuit conforming to a serial bus such as universal serial bus (USB), is electrically connected to an unillustrated information processing device (for example, a personal computer or a mobile information terminal), and transmits and receives an input image and various types of information. Further, a communication module including an antenna transmitting and receiving wireless signals, and a wireless communication interface device for transmitting and receiving signals through a wireless communication line in conformance with a predetermined communication protocol may be used in place of the interface device 142. For example, the predetermined communication protocol is a wireless local area network (LAN).

The storage device 150 includes a memory device such as a random access memory (RAM) or a read only memory (ROM), a fixed disk device such as a hard disk, or a portable storage device such as a flexible disk or an optical disk. Further, the storage device 150 stores a computer program, a database, a table, etc., used for various types of processing in the medium conveying apparatus 100. The computer program may be installed on the storage device 150 from a computer-readable, non-transitory medium such as a compact disk read only memory (CD-ROM), a digital versatile disk read only memory (DVD-ROM), etc., by using a well-known setup program, etc.

For example, the processing circuit 160 is a processor, such as a central processing unit (CPU). The processing circuit 160 operates in accordance with a program previously stored in the storage device 150. The processing circuit 160 may be a digital signal processor (DSP), a large scale integration (LSI), an application specific integrated circuit (ASIC), a field-programmable gate array (FPGA), etc.

The processing circuit 160 is connected to the operation device 105, the display device 106, the medium detection sensor 111, the ultrasonic sensor 114, the first center sensor 115, the first side sensor 116, the second side sensor 117, the second center sensor 120, the imaging devices 121, the driving device 141, the interface device 142, the storage device 150, the processing circuit 170, etc., and controls each of these units. The processing circuit 160 performs drive control of the driving device 141, imaging control of the imaging devices 121, etc., acquires an input image, and transmits the input image to the information processing device through the interface device 142. Further, the processing circuit 160 detects a skew of a fed medium based on a signal generated by the first side sensor 116 or the second side sensor 117, and corrects the skew of the medium based on the detection result. Further, the processing circuit 160 detects the media multi-feed based on a signal generated by the ultrasonic sensor 114, and when the media multi-feed is detected, restores the media.

The processing circuit 170 executes predetermined image processing on an image imaged by the imaging device 121 and stores the image on which the image processing is executed into the storage device 150. A DSP, an LSI, an ASIC, an FPGA, etc., may be used in place of the processing circuit 170.

Figure 11:
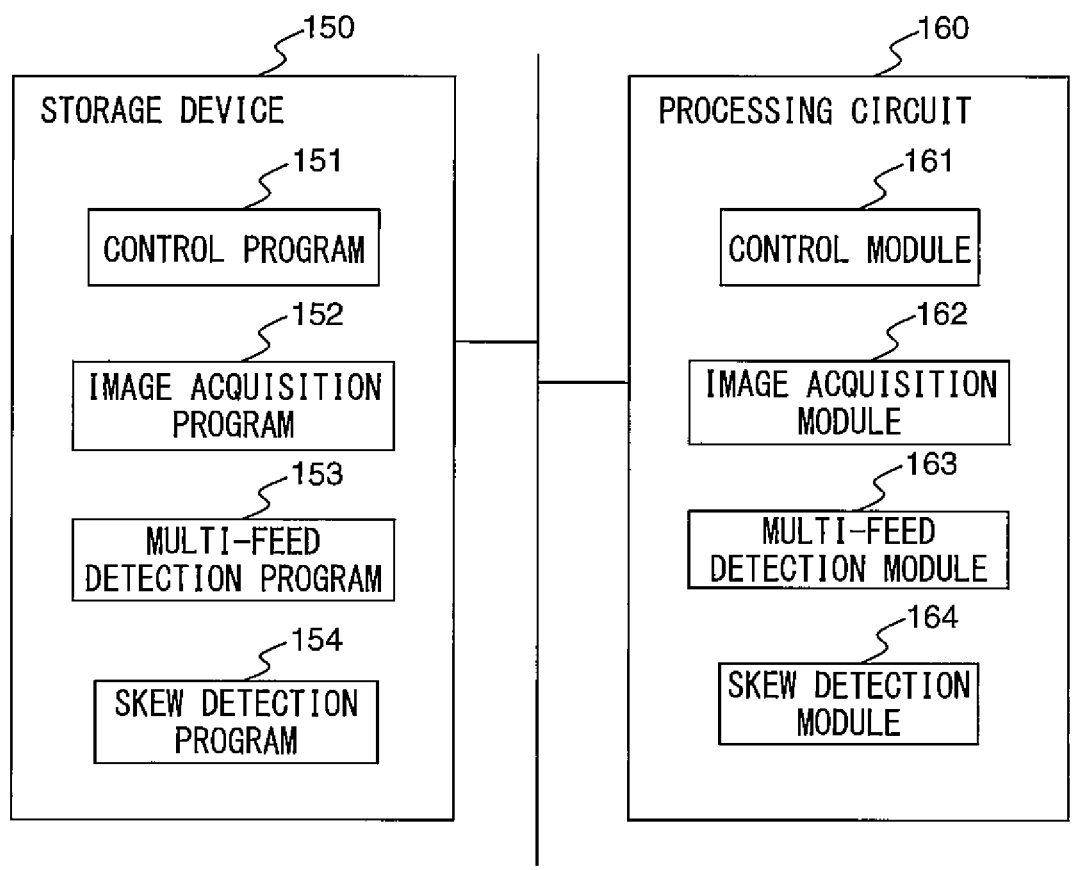
FIG. 11 is a diagram illustrating schematic configurations of a storage device 150 and a processing circuit 160.

FIG. 11 is a diagram illustrating schematic configurations of the storage device 150 and the processing circuit 160.

As illustrated in FIG. 11, the storage device 150 stores a control program 151, an image acquisition program 152, a multi-feed detection program 153, a skew detection program 154, etc. Each of these programs is a functional module implemented by software operating on a processor. The processing circuit 160 reads each program stored in the storage device 150 and operates in accordance with each read program. Consequently, the processing circuit 160 functions as a control module 161, an image acquisition module 162, a multi-feed detection module 163, and a skew detection module 164.

Figure 12:
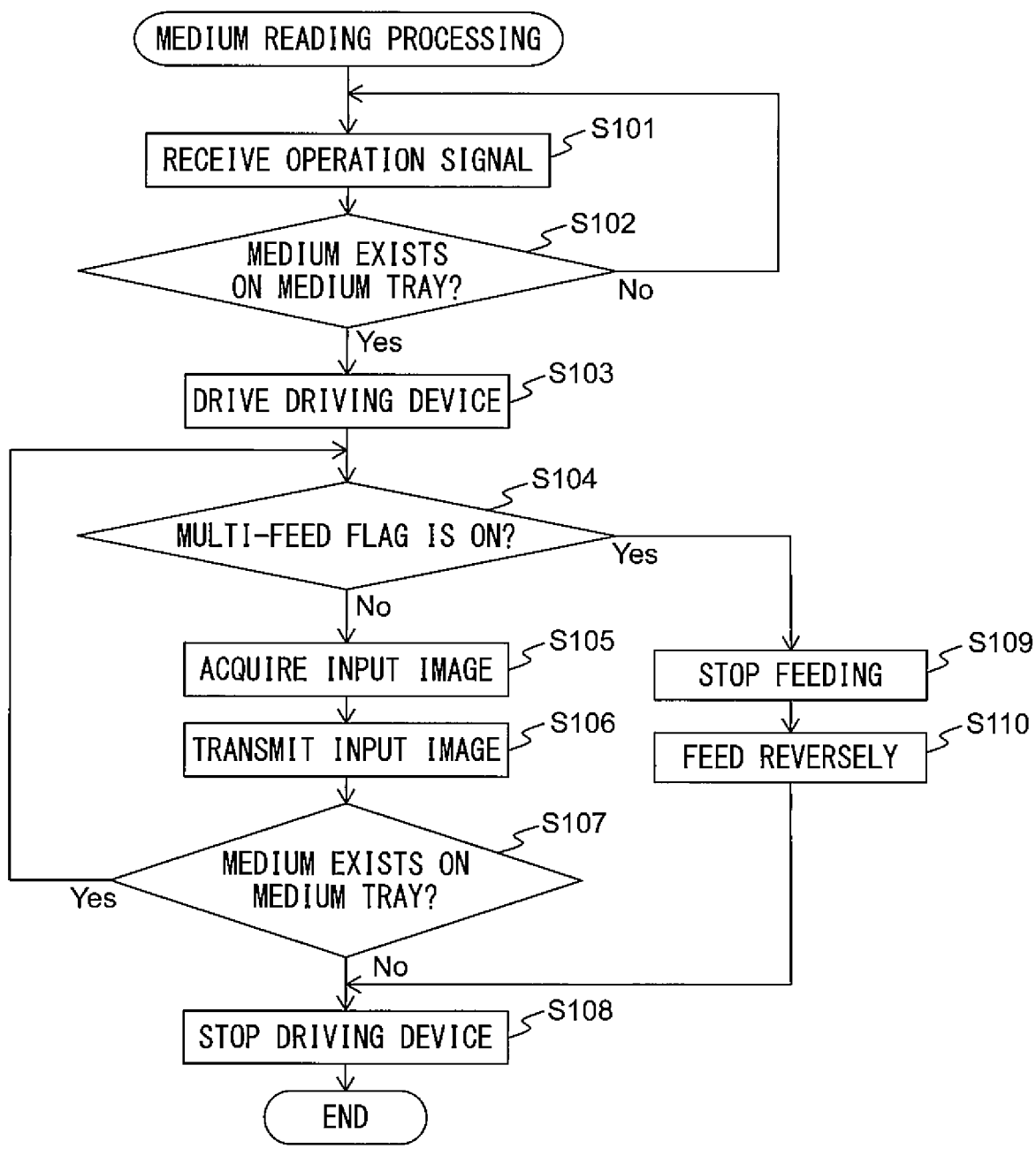
FIG. 12 is a flowchart illustrating an operation example of medium reading processing.

FIG. 12 is a flowchart illustrating an operation example of medium reading processing in the medium conveying apparatus 100.

Referring to the flowchart illustrated in FIG. 12, an operation example of the medium reading processing in the medium conveying apparatus 100 will be described below. The operation flow described below is executed mainly by the processing circuit 160 in cooperation with each element in the medium conveying apparatus 100, in accordance with a program previously stored in the storage device 150. The operation flow illustrated in FIG. 12 is periodically executed.

First, the control module 161 stands by until an instruction to read a medium is input by a user by use of the operation device 105, and an operation signal instructing to read the medium is received from the operation device 105 (step S101).

Next, the control module 161 acquires a medium detection signal from the medium detection sensor 111 and determines whether or not a medium is placed on the medium tray 103, based on the acquired medium detection signal (step S102).

When a medium is not placed on the medium tray 103, the control module 161 returns the processing to step S101 and stands by until newly receiving an operation signal from the operation device 105.

On the other hand, when a medium is placed on the medium tray 103, the control module 161 drives the driving device 141, rotates the feed rollers 112, the brake rollers 113, and the first to fourth conveyance rollers 118, 119, 122, and 123, and feeds and conveys the medium (step S103). The control module 161 performs control in such a way that the first motor 131 and the second motor generate the first driving force, the feed rollers 112 rotate in the medium feeding direction A2, and the brake rollers 113 rotate in the direction A3 opposite to the medium feeding direction. In other words, when feeding a medium, the control module 161 transmits the first driving force to the brake rollers 113 by the first transmission mechanism.

Next, the control module 161 determines whether or not a multi-feed flag is ON (step S104). The multi-feed flag is set to OFF at a start of reading for each medium and is set to ON when the multi-feed detection module 163 determines occurrence of the media multi-feed in multi-feed detection processing to be described later.

When the multi-feed flag is OFF, the image acquisition module 162 causes the imaging device 121 to image the conveyed medium and acquires an input image (step S105).

The image acquisition module 162 acquires a second center signal from the second center sensor 120 and determines whether or not a medium exists at the position of the second center sensor 120 based on the acquired second center signal. When a signal value of the second center signal changes from a value indicating nonexistence of a medium to a value indicating existence of a medium, the image acquisition module 162 determines that the front edge of the medium passes the position of the second center sensor 120 and causes the imaging device 121 to start imaging. On the other hand, when a signal value of the second center signal changes from the value indicating existence of a medium to the value indicating nonexistence of a medium, the image acquisition module 162 determines that the rear edge of the medium passes the position of the second center sensor 120. The image acquisition module 162 causes the imaging device 121 to end the imaging when a predetermined period elapses after determining that the rear edge of the medium passes the position of the second center sensor 120.

Next, the image acquisition module 162 transmits the input image to the information processing device through the interface device 142 (step S106). When not being connected to the information processing device, the image acquisition module 162 stores the input image in the storage device 150.

Next, the control module 161 determines whether or not a medium remains on the medium tray 103 based on a medium detection signal acquired from the medium detection sensor 111 (step S107). When a medium remains on the medium tray 103, the control module 161 returns the processing to step S104 and repeats the processing in steps S104 to S107.

On the other hand, when a medium does not remain on the medium tray 103, the control module 161 stops the driving device 141 (step S108) and ends the series of steps.

On the other hand, when the multi-feed flag is ON in step S104, the control module 161 stops feeding media by stopping the driving device 141 as abnormal processing and also sets the multi-feed flag to OFF (step S109). The control module 161 may notify a user of occurrence of abnormality by an unillustrated speaker, LED, etc.

Next, by driving the driving device 141, the control module 161 causes the feed rollers 112 and the brake rollers 113 to rotate, and convey the fed media toward the medium tray 103 (step S110). The control module 161 performs control in such a way that the first motor 131 and the second motor generate the second driving force, the feed rollers 112 rotate in the direction opposite to the medium feeding direction A2, and the brake rollers 113 rotate in the direction A3 opposite to the medium feeding direction. Consequently, the control module 161 reversely feed the fed media toward the medium tray 103 in such a way that the media is reset to the medium tray 103.

Specifically, when the media multi-feed is detected, the control module 161 performs control in such a way that the second driving force is transmitted to the brake rollers 113 by the second transmission mechanism, and also the feed rollers 112 are driven to rotate in the direction opposite to the medium feeding direction A2 by the brake rollers 113. As described above, the control module 161 performs control in such a way that the respective rotation axes (the second shaft 135b and the third shaft 135c) of the feed rollers 112 rotate at a rotation speed faster than a rotation speed of the respective outer peripheral surfaces 136a and b of the feed rollers 112 driven to rotate by the brake rollers 113.

Next, by stopping the driving device 141 after causing the feed rollers 112 and the brake rollers 113 to rotate for a certain time (for example, 3 seconds), the control module 161 resets the media to the medium tray 103 (step S108) and ends the series of steps. The control module 161 may rotate the feed rollers 112 and the brake rollers 113 until the multi-feed detection module 163 determines that media multi-feed is not occurring (is cleared) in the multi-feed detection processing and then stop the driving device 141. Further, the control module 161 may return the processing to step S103 after resetting the media to the medium tray 103 and automatically refeed the media. Consequently, a user does not need to refeed the media, and the control module 161 can improve user convenience.

Figure 13:
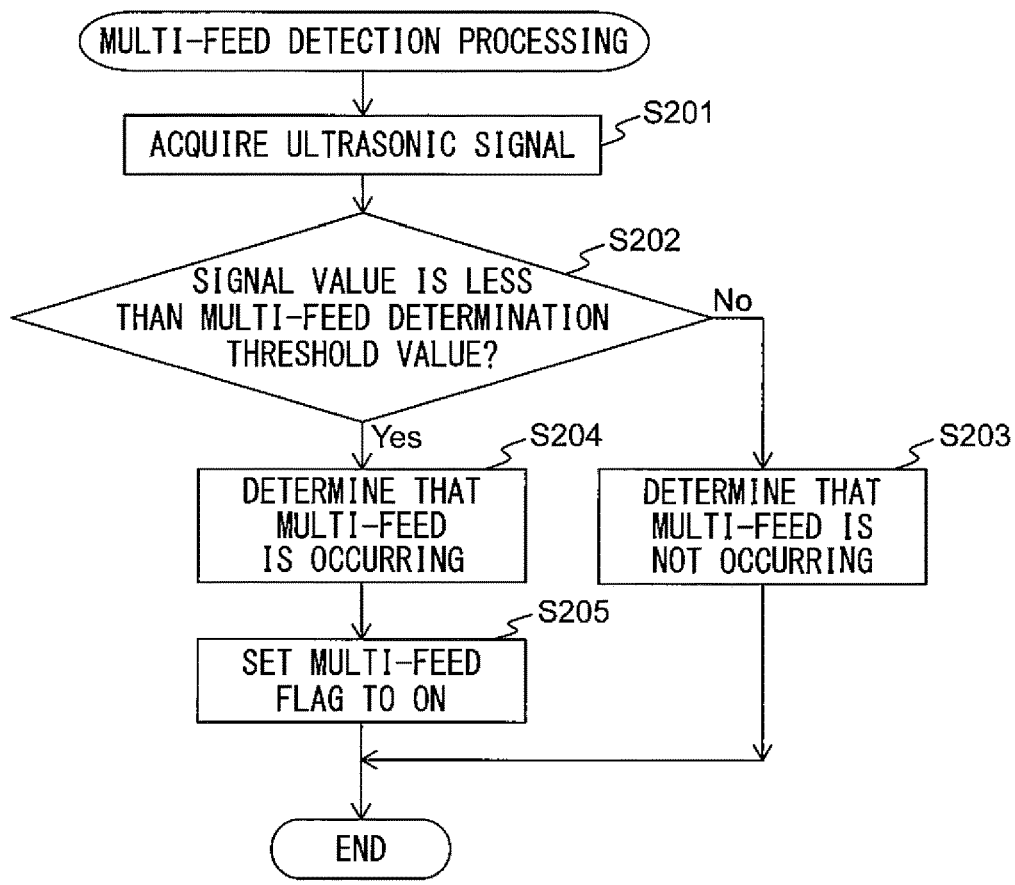
FIG. 13 is a flowchart illustrating an operation example of multi-feed detection processing.

FIG. 13 is a flowchart illustrating an operation example of the multi-feed detection processing.

Referring to the flowchart illustrated in FIG. 13, an operation example of the multi-feed detection processing in the medium conveying apparatus 100 will be described below. The operation flow described below is executed mainly by the processing circuit 160 in cooperation with each element in the medium conveying apparatus 100, in accordance with a program previously stored in the storage device 150. The flowchart illustrated in FIG. 13 is periodically executed during medium conveyance. The flowchart illustrated in FIG. 13 may be executed only in a period from a moment when the front edge of a medium passes the first center sensor 115 to a moment when the front edge passes the second center sensor 120.

First, the multi-feed detection module 163 acquires an ultrasonic signal from the ultrasonic sensor 114 (step S201).

Next, the multi-feed detection module 163 determines whether or not a signal value of the acquired ultrasonic signal is less than a multi-feed determination threshold value (step S202).

Figure 14:
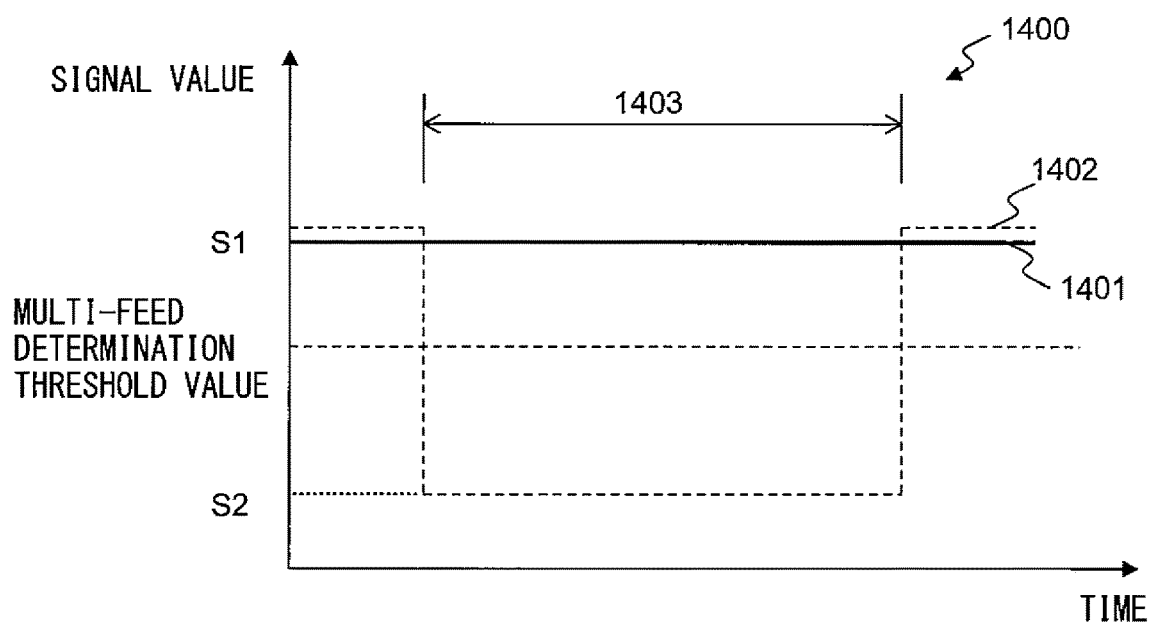
FIG. 14 is a schematic diagram for illustrating a characteristic of an ultrasonic signal.

FIG. 14 is a schematic diagram for illustrating a characteristic of an ultrasonic signal.

In a graph 1400 in FIG. 14, a solid line 1401 represents a characteristic of an ultrasonic signal when one sheet of paper is conveyed as a medium, and a dotted line 1402 represents a characteristic of an ultrasonic signal when multi-feed of paper is occurring. The horizontal axis of the graph 1400 indicates time, and the vertical axis indicates a signal value of an ultrasonic signal. Due to occurrence of multi-feed, a signal value of the ultrasonic signal in the dotted line 1402 declines in a section 1403. The multi-feed determination threshold value is set to a value between a signal value S1 of an ultrasonic signal when one sheet of paper is conveyed and a signal value S2 of an ultrasonic signal when multi-feed of paper is occurring. By determining whether or not a signal value of an ultrasonic signal is less than the multi-feed determination threshold value, the multi-feed detection module 163 can determine whether or not media multi-feed is occurring.

When a signal value of the ultrasonic signal is greater than or equal to the multi-feed determination threshold value, the multi-feed detection module 163 determines that multi-feed is not occurring (step S203) and ends the series of steps.

On the other hand, when a signal value of the ultrasonic signal is less than the multi-feed determination threshold value, the multi-feed detection module 163 determines that media multi-feed is occurring (step S204). Next, the multi-feed detection module 163 sets the multi-feed flag to ON (step S205) and ends the series of steps. Thus, the multi-feed detection module 163 detects the media multi-feed based on an ultrasonic signal generated by the ultrasonic sensor 114.

Figure 15:
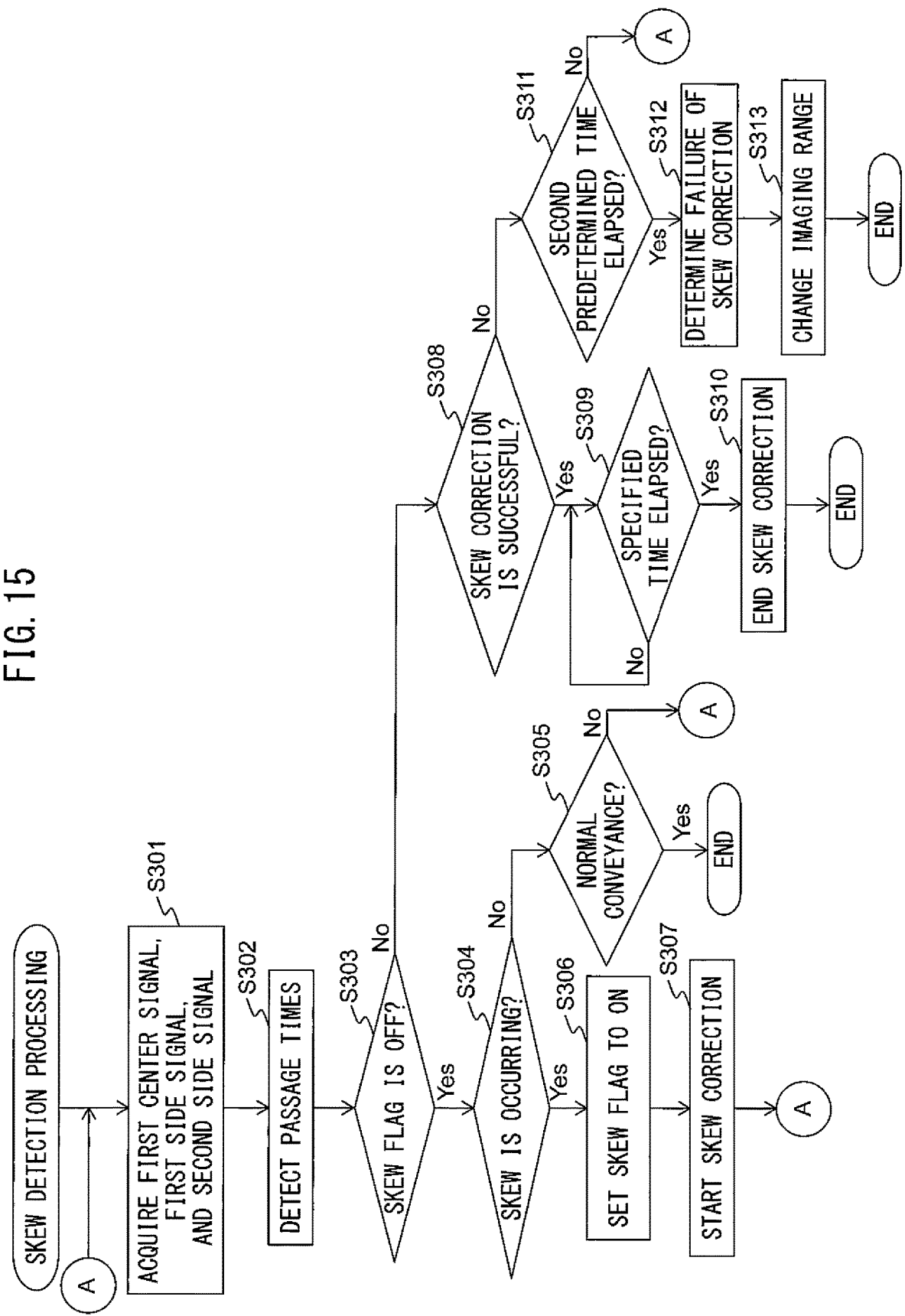
FIG. 15 is a flowchart illustrating an operation example of skew detection processing.

FIG. 15 is a flowchart illustrating an operation example of skew detection processing.

Referring to the flowchart illustrated in FIG. 15, an operation example of the skew detection processing in the medium conveying apparatus 100 will be described below. The operation flow described below is executed mainly by the processing circuit 160 in cooperation with each element in the medium conveying apparatus 100, in accordance with a program previously stored in the storage device 150. The flowchart illustrated in FIG. 15 is periodically executed.

First, the skew detection module 164 acquires a first center signal, a first side signal, and a second side signal from the first center sensor 115, the first side sensor 116, and the second side sensor 117, respectively (step S301).

Next, the skew detection module 164 detects passage times when the front edge of a medium passes the first center sensor 115, the first side sensor 116, and the second side sensor 117, respectively, based on the first center signal, the first side signal, and the second side signal (step S302).

In each of the first center signals acquired up to that point in time, the skew detection module 164 detects a time when a signal value changes from a value indicating a state in which a medium does not exist to a value indicating a state in which a medium exists, as a passage time of the first center sensor 115. Similarly, in each of the first side signals acquired up to that point in time, the skew detection module 164 detects a time when a signal value changes from a value indicating a state in which a medium does not exist to a value indicating a state in which a medium exists, as a passage time of the first side sensor 116. Similarly, in each of the second side signals acquired up to that point in time, the skew detection module 164 detects a time when a signal value changes from a value indicating a state in which a medium does not exist to a value indicating a state in which a medium exists, as a passage time of the second side sensor 117.

Next, the skew detection module 164 determines whether or not a skew flag is OFF (step S303). The skew flag is set to OFF at a start of reading for each medium and is set to ON when a skew is determined to occur in the skew detection processing.

When the skew flag is OFF, the skew detection module 164 determines whether or not a skew of a medium is occurring, based on each passage time detected in step S302 (step S304). The skew detection module 164 determines occurrence of a skew when the front edge of the medium does not pass the first center sensor 115 before a predetermined time elapses from a time being the earlier of the passage time of the first side sensor 116 and the passage time of the second side sensor 117. The predetermined time is set to a value between a difference between the passage time of the first or second side sensor 116 or 117 and the passage time of the first center sensor 115 when a medium is tilted and collides with a side wall of the conveyance path, and a difference between the respective passage times when a medium does not collide with the side wall of the conveyance path, based on a previously performed experiment. For example, the predetermined time is set to 1 second. The predetermined time may be set to 0. In that case, the skew detection module 164 determines occurrence of a skew when a medium is conveyed with a slightest tilt, and the control module 161 corrects the skew of the medium.

Thus, the skew detection module 164 detects a skew of a fed medium based on the first center signal acquired from the first center sensor 115, the first side signal acquired from the first side sensor 116, and the second side signal acquired from the second side sensor 117.

When determining that a skew of a medium is not occurring, the skew detection module 164 determines whether or not the medium is normally conveyed, based on each detected passage time (step S305). The skew detection module 164 determines that the medium is normally conveyed when the front edge of the medium passes the first center sensor 115 before a predetermined time elapses from a time being the earlier of the passage time of the first side sensor 116 and the passage time of the second side sensor 117. In this case, the skew detection module 164 ends the series of steps. On the other hand, the skew detection module 164 returns the processing to step S301 when the predetermined time does not elapse from the time being the earlier of the passage time of the first side sensor 116 and the passage time of the second side sensor 117, and also the front edge of the medium does not pass the first center sensor 115. In other words, in this case, the skew detection module 164 does not yet determine whether a skew is occurring or the medium is normally conveyed.

On the other hand, when determining occurrence of a skew of the medium, that is, when detecting a skew of the medium, the skew detection module 164 sets the skew flag to ON (step S306).

Next, the control module 161 starts skew correction of the medium (step S307) and moves the processing to step S301. The control module 161 corrects the skew of the medium by making circumferential speeds of a plurality of feed rollers 112a and b mutually different, that is, by changing the speed of at least one of a plurality of feed rollers 112a and b. The control module 161 changes a circumferential speed of each feed roller 112 in such a way that a circumferential speed of a feed roller 112 located on the side where progression of the medium is delayed in the direction A8 perpendicular to the medium conveying direction is faster (higher) than a circumferential speed of a feed roller 112 located on the preceding side. The control module 161 accelerates (increases) the circumferential speed of the feed roller 112 located on the side where progression of the medium is delayed and/or decelerates (decreases) the circumferential speed of the feed roller 112 located on the preceding side. For example, the control module 161 sets each circumferential speed in such a way that the circumferential speed of the feed roller 112 located on the side where progression of the medium is delayed is faster than the circumferential speed of the feed roller 112 located on the preceding side by a factor greater than or equal to three and less than or equal to ten.

Figure 16:
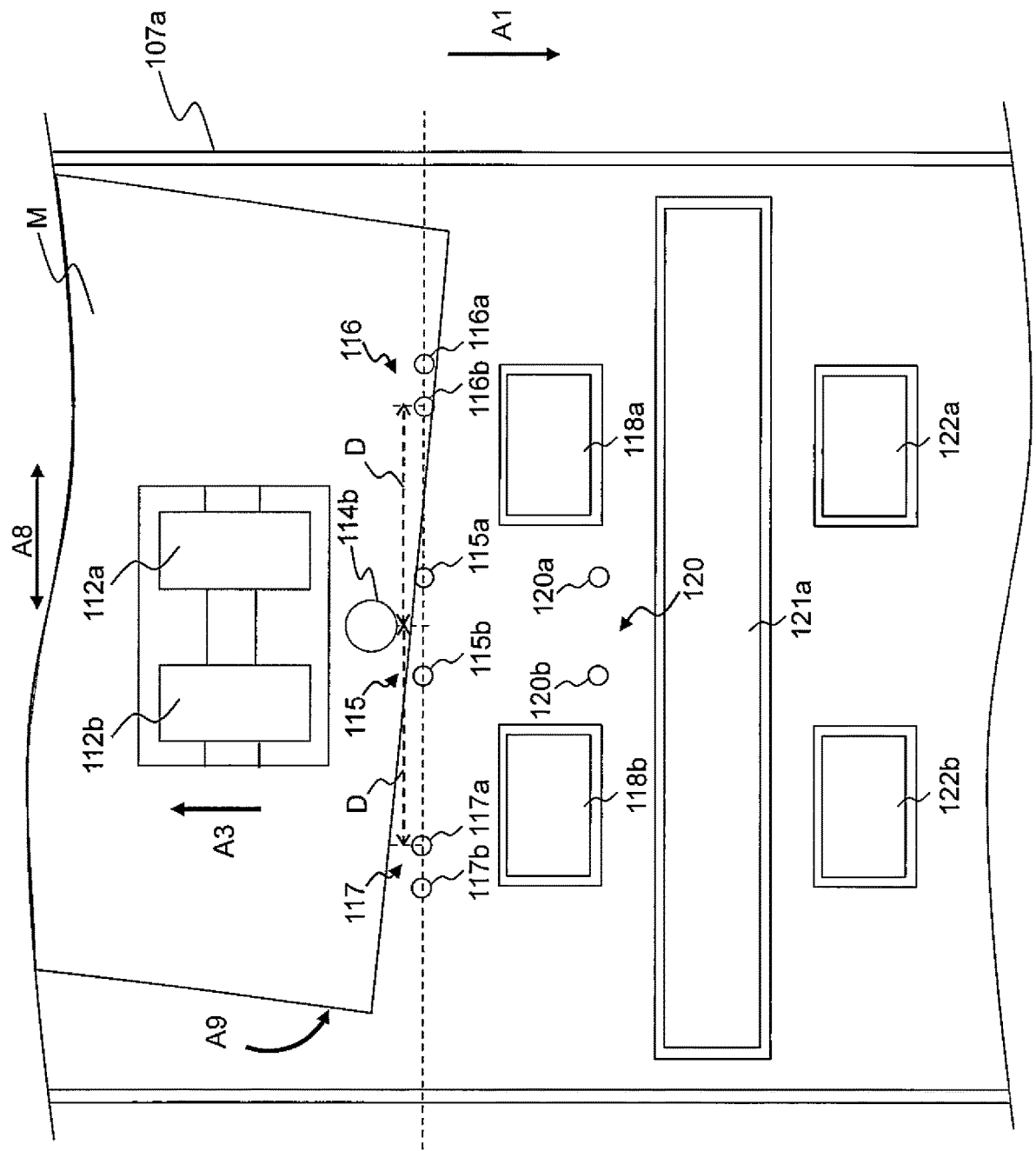
FIG. 16 is a schematic diagram for illustrating a relation between a tilt of a medium and a passage time.

FIG. 16 is a schematic diagram for illustrating a relation between a tilt of a medium and a passage time of each sensor. FIG. 16 is a schematic diagram of the lower housing 101 viewed from above in a state in which the upper housing 102 is removed, similarly to FIG. 9.

As illustrated in FIG. 16, when a medium M is fed while being tilted toward the second side sensor 117 side, the front edge of the medium M passes the first side sensor 116 and then passes the first center sensor 115. In that case, as the tilt of the medium M becomes greater, a period between a time when the first side sensor 116 is passed and a time when the first center sensor 115 is passed increases.

Accordingly, when the front edge of the medium does not pass the first center sensor 115 within a predetermined time from the passage time of the first side sensor 116, the control module 161 determines that the medium is fed while being tilted toward the second side sensor 117 side. In that case, the control module 161 changes a circumferential speed of each feed roller 112 in such a way that the circumferential speed of the feed roller 112b located on the second side sensor 117 side is faster (higher) than the circumferential speed of the feed roller 112 located on the first side sensor 116 side. Consequently, the medium rotates toward a direction A9 of the first side sensor 116, and the skew of the medium is corrected.

On the other hand, when the front edge of the medium does not pass the first center sensor 115 within the predetermined time from the passage time of the second side sensor 117, the control module 161 determines that the medium is fed while being tilted toward the first side sensor 116 side. In that case, the control module 161 changes the circumferential speed of each feed roller 112 in such a way that the circumferential speed of the feed roller 112a located on the first side sensor 116 side is faster (higher) than the circumferential speed of the feed roller 112b located on the second side sensor 117 side. Consequently, the medium rotates toward a direction of the second side sensor 117, and the skew of the medium is corrected.

As described above, each of the feed rollers 112a and b is provided in such a way as to independently rotate, and feed a medium, by the separate first motor 131 and second motor. On the other hand, the brake rollers 113a and b are separately provided with the second torque limiters 139a and b, respectively, and therefore the brake rollers 113a and b are independently driven to rotate by the feed rollers 112a and b, respectively. In other words, each of the second torque limiters 139a and b cuts off connection of a corresponding one of the rotation axes of the brake rollers 113a and b and a corresponding one of the brake rollers 113a and b, to cause the corresponding one of the brake rollers 113a and b independently be driven to rotate by a corresponding one of the feed rollers 112a and b when a power exceeding a predetermined value is applied to the corresponding one of the brake rollers 113a and b. Assuming that each of the brake rollers 113a and b is not driven to rotate independently, even when respective circumferential speeds of the feed rollers 112 are different, a conveyance load (a separating force of the medium) applied to the medium in the direction A3 opposite to the medium feeding direction by each of the brake rollers 113a and b are at the same level. Accordingly, a force for rotating the medium toward a direction of a side sensor on the side of a feed roller 112 with a lower circumferential speed (the direction A9 in the example in FIG. 16) decreases, and the skew of the medium becomes less likely to be corrected.

On the other hand, when each of the brake rollers 113a and b is driven to rotate independently, a conveyance load applied to the medium in the direction A3 opposite to the medium feeding direction by each of the brake rollers 113a and b varies between circumferential speeds of the feed rollers 112a and b facing the brake rollers 113a and b, respectively. Specifically, a conveyance load applied to the medium in the direction A3 opposite to the medium feeding direction by a brake roller 113 facing a feed roller 112 with a lower circumferential speed is less than a conveyance load applied to the medium in the direction A3 opposite to the medium feeding direction by the other brake roller 113. Accordingly, a force for rotating the medium toward a direction of a side sensor on the side of the feed roller 112 with the lower circumferential speed (the direction A9 in the example in FIG. 16) increases, and the skew of the medium becomes more likely to be corrected.

The control module 161 may set each circumferential speed of the feed rollers 112 in such a way that as a period from the passage time of the first side sensor 116 or the passage time of the second side sensor 117 to the passage time of the first center sensor 115 becomes greater, a difference between the circumferential speeds becomes greater. Consequently, the control module 161 can correct a skew of a medium in a shorter period. Further, the control module 161 may set a circumferential speed of a feed roller 112 located on the preceding side to 0. Consequently, a part of a medium on the delaying side can be progressed in the direction A8 perpendicular to the medium conveying direction while keeping a part of the medium on the preceding side at the position, and therefore a skew of the medium can be more reliably corrected. Alternatively, the control module 161 may set both of circumferential speeds of a plurality of feed rollers 112a and 112b to mutually different values greater than 0. Consequently, the control module 161 can convey a medium while correcting a skew of the medium and therefore can convey the medium in a shorter period.

On the other hand, when the skew flag is ON in step S303, the control module 161 determines whether or not skew correction of a medium is successful based on each passage time detected in step S302 (step S308). The control module 161 determines successful skew correction of the medium when the front edge of the medium passes the first center sensor 115 or a side sensor located on the side where progression of the medium is delayed within a second predetermined time from a start of the skew correction in step S307. For example, the second predetermined time is set to 1 second.

When determining successful skew correction of the medium, the control module 161 stands by until a specified time further elapses (step S309).

When a circumferential speed of a feed roller 112 located on the preceding side is set to a value greater than 0, a part of a medium on the preceding side also progresses during skew correction of the medium. During a time T from a start of skew correction to a time when a part of the medium on the delaying side passes the first center sensor 115 etc., the part of the medium on the preceding side progresses by a distance ($V_A \times T$) acquired by multiplying a circumferential speed $V_A$ of the feed roller 112 located on the preceding side by the time T. The difference between the part of the medium on the delaying side and the part of the medium on the preceding side shortens at a speed ($V_B - V_A$) acquired by subtracting the circumferential speed $V_A$ of the feed roller 112 located on the preceding side from a circumferential speed $V_B$ of a feed roller 112 located on the delaying side.

Accordingly, even after the first center sensor 115 etc., detects the medium, the control module 161 rotates each feed roller 112 at a set circumferential speed and continues the skew correction of the medium until a specified time calculated by equation (1) below elapses.

$$\text{(Specified time)} = (V_A \times T)/(V_B - V_A) \quad (1)$$

Consequently, the control module 161 can cause the part of the medium on the delaying side to catch up with the part of the medium on the preceding side. The processing in step S309 may be omitted.

Next, the control module 161 resets the circumferential speed of each feed roller 112 to the original circumferential speed and ends the skew correction of the medium (step S310); and then ends the series of steps.

On the other hand, when not determining successful skew correction of the medium in step S308, the control module 161 determines whether or not a second predetermined time elapses after a start of the skew correction of the medium (step S311). When the second predetermined time has not yet elapsed from the start of the skew correction of the medium, the control module 161 moves the processing to step S301.

On the other hand, when the second predetermined time has elapsed after the start of the skew correction of the medium, the control module 161 determines failure of the skew correction of the medium (step S312).

Next, the control module 161 changes an imaging range of the imaging device 121 the medium conveying direction A1 (step S313) and ends the series of steps.

As described above, when a skew of a medium is not occurring, the imaging device 121 starts imaging when the front edge of the medium passes the position of the second center sensor 120 and ends the imaging when a predetermined period elapses after the rear edge of the medium passes the position of the second center sensor 120. However, when a skew of the medium is occurring, a preceding part of the medium may reach the position of the imaging device 121 when the front edge of the medium passes the position of the second center sensor 120. Further, when the predetermined period elapses after the rear edge of the medium passes the position of the second center sensor 120, a delaying part of the medium may be remaining at the position of the imaging device 121.

Accordingly, the control module 161 makes an imaging range of the imaging device 121 in the medium conveying direction A1 larger than an imaging range when a skew of a medium is not occurring. For example, the control module 161 causes the imaging device 121 to start imaging before the front edge of a medium passes the position of the second center sensor 120, that is, for example, immediately after determining failure of skew correction of the medium. Further, the control module 161 causes the imaging device 121 to end the imaging when a second predetermined period longer than the predetermined period elapses after the rear edge of the medium passes the position of the second center sensor 120. Consequently, the control module 161 can cause the imaging device 121 to image the medium in such a way that the entire skewed medium is included in an input image.

The medium conveying apparatus 100 may omit the first center sensor 115 and detect a skew of a medium by use of two sensors being the first side sensor 116 and the second side sensor 117. In that case, in step S304, the skew detection module 164 detects a skew of the medium when either one sensor of the first side sensor 116 and the second side sensor 117 does not detect the medium within a predetermined time after the other sensor detects the medium. The one sensor is an example of a first sensor, and the other sensor is an example of a second sensor. Further, in step S305, the skew detection module 164 determines that the medium is normally conveyed when either one sensor of the sensors detects the medium within a predetermined time after the other sensor detects the medium.

Further, in step S308, the control module 161 determines successful skew correction of a medium when the one sensor detects the medium within a second predetermined time from a start of the skew correction. Further, in steps S309 and S310, the control module 161 rotates each feed roller 112 at a set circumferential speed and continues the skew correction of the medium until a specified time elapses even after the one sensor detects the medium. Furthermore, in steps S311 and S312, the control module 161 determines failure of skew correction of the medium when the one sensor does not detect the medium within the second predetermined time from the start of the skew correction.

Further, the medium conveying apparatus 100 may detect a skew of a medium by use of a plurality of encoders in place of the first side sensor 116 and the second side sensor 117. In that case, the medium conveying apparatus 100 includes a plurality of encoders being located between the feed rollers 112 and the first conveyance rollers 118 in the medium conveying direction A1 and also being spaced and located alongside in the direction A8 perpendicular to the medium conveying direction. Each encoder includes a disk having a large number of slits (light transmission holes) formed thereon and being provided in such a way as to rotate according to a conveyed medium, and a light emitter and a light receiver provided in such a way as to face one another with the disk in between. Each light receiver detects a movement distance of a medium at certain intervals based on a changeover count between a state in which a slit exists between each light emitter and each light receiver, and a state in which a slit does not exist and light is blocked by the disk.

The skew detection module 164 detects a movement of a medium based on a movement distance detected by each encoder and detects a skew of the medium based on a difference in a timing when each encoder first detects a movement of the medium. Alternatively, the skew detection module 164 may detect a skew of the medium based on a difference in a movement distance detected by each encoder. Further, the skew detection module 164 determines whether or not skew correction of a medium is successful based on a difference in a timing when each encoder first detects a movement of the medium or a difference in a movement distance detected by each encoder, and ends the skew correction.

As described in detail above, separate second torque limiters 139a and b are provided with the brake rollers 113 facing feed rollers 112, respectively, in the medium conveying apparatus 100; and the medium conveying apparatus 100 corrects a skew of a medium by making circumferential speeds of the plurality of feed rollers 112 mutually different. Consequently, the medium conveying apparatus 100 can reduce a force applied to a medium in the direction A3 opposite to the medium feeding direction by a brake roller 113 facing a feed roller 112 with a lower circumferential speed and can more suitably correct a skew of the medium.

Further, when the media multi-feed occurs, the medium conveying apparatus 100 makes a limit value of torque applied to the brake roller 113 greater than a limit value when feeding a medium and also causes the feed rollers 112 to be driven to rotate by the brake rollers 113. Consequently, when the media multi-feed occurs, the medium conveying apparatus 100 can reset all of a plurality of media fed between the brake rollers 113 and the feed rollers 112 to the medium tray 103 and more suitably restore the media.

Figure 17:
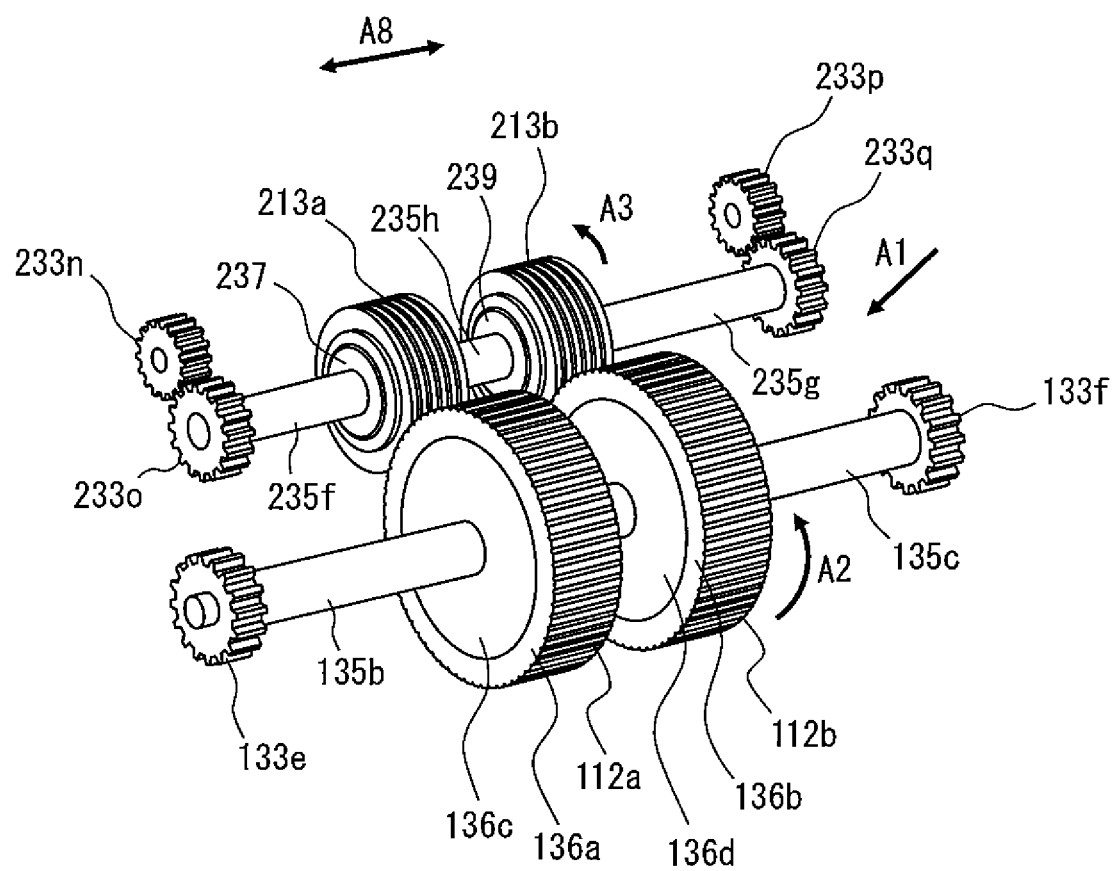
FIG. 17 is a schematic diagram for illustrating a driving mechanism in another medium conveying apparatus.

FIG. 17 is a schematic diagram for illustrating a driving mechanism in a medium conveying apparatus according to another embodiment. FIG. 17 is a schematic diagram of the driving mechanism of the medium conveying apparatus viewed from the upstream side in a medium conveying direction A1.

As illustrated in FIG. 17, the driving mechanism in the medium conveying apparatus includes brake rollers 213a and b, fourteenth to seventeenth gears 233n to q, sixth to eighth shafts 235f to h, a first torque limiter 237, and a second torque limiter 239a, in place of the brake rollers 113 and the driving mechanism of the brake rollers 113.

The fourteenth gear 233n is connected to a third motor (unillustrated) through a driving mechanism including a first electromagnetic clutch and is engaged with the fifteenth gear 233o. The fifteenth gear 233o is mounted at one end of the sixth shaft 235f, and the brake roller 213a is mounted at the other end of the sixth shaft 235f through the first torque limiter 237 in such a way as to rotate according to rotation of the sixth shaft 235f. On the other hand, the sixteenth gear 233p is connected to a fourth motor (unillustrated) through a driving mechanism including a second electromagnetic clutch and is engaged with the seventeenth gear 233q. The seventeenth gear 233q is mounted at one end of the seventh shaft 235g, and the brake roller 213b is mounted at the other end of the seventh shaft 235g through the second torque limiter 239 in such a way as to rotate according to rotation of the seventh shaft 235g.

The brake roller 213a and the brake roller 213b are connected through the eighth shaft 235h, bypassing the first torque limiter 237 and the second torque limiter 239, in such a way that each brake roller rotates according to rotation of the other brake roller. A torque limit value of the first torque limiter 237 is a first limit value, and a torque limit value of the second torque limiter 239 is a second limit value.

The third motor generates a first driving force, and the fourth motor generates a second driving force. When causing the third motor to generate the first driving force, the control module 161 sets the second electromagnetic clutch to OFF and interrupts transmission of a driving force between the fourth motor and the sixteenth gear 233p. Consequently, the first driving force is transmitted to the brake rollers 213a and b through the first torque limiter 237, bypassing the second torque limiter 239, and the brake rollers 213a and b rotate in a direction A3 opposite to the medium feeding direction. On the other hand, when causing the fourth motor to generate the second driving force, the control module 161 sets the first electromagnetic clutch to OFF and interrupts transmission of a driving force between the third motor and the fourteenth gear 233n. Consequently, the second driving force is transmitted to the brake rollers 213a and b through the second torque limiter 239, bypassing the first torque limiter 237, and the brake rollers 213a and b rotate in the direction A3 opposite to the medium feeding direction.

As described in detail above, even when a planetary gear is not used for switching transmission mechanisms, the medium conveying apparatus can more suitably correct a skew of a medium and can more suitably restore media when the media multi-feed occurs.

Figure 18:
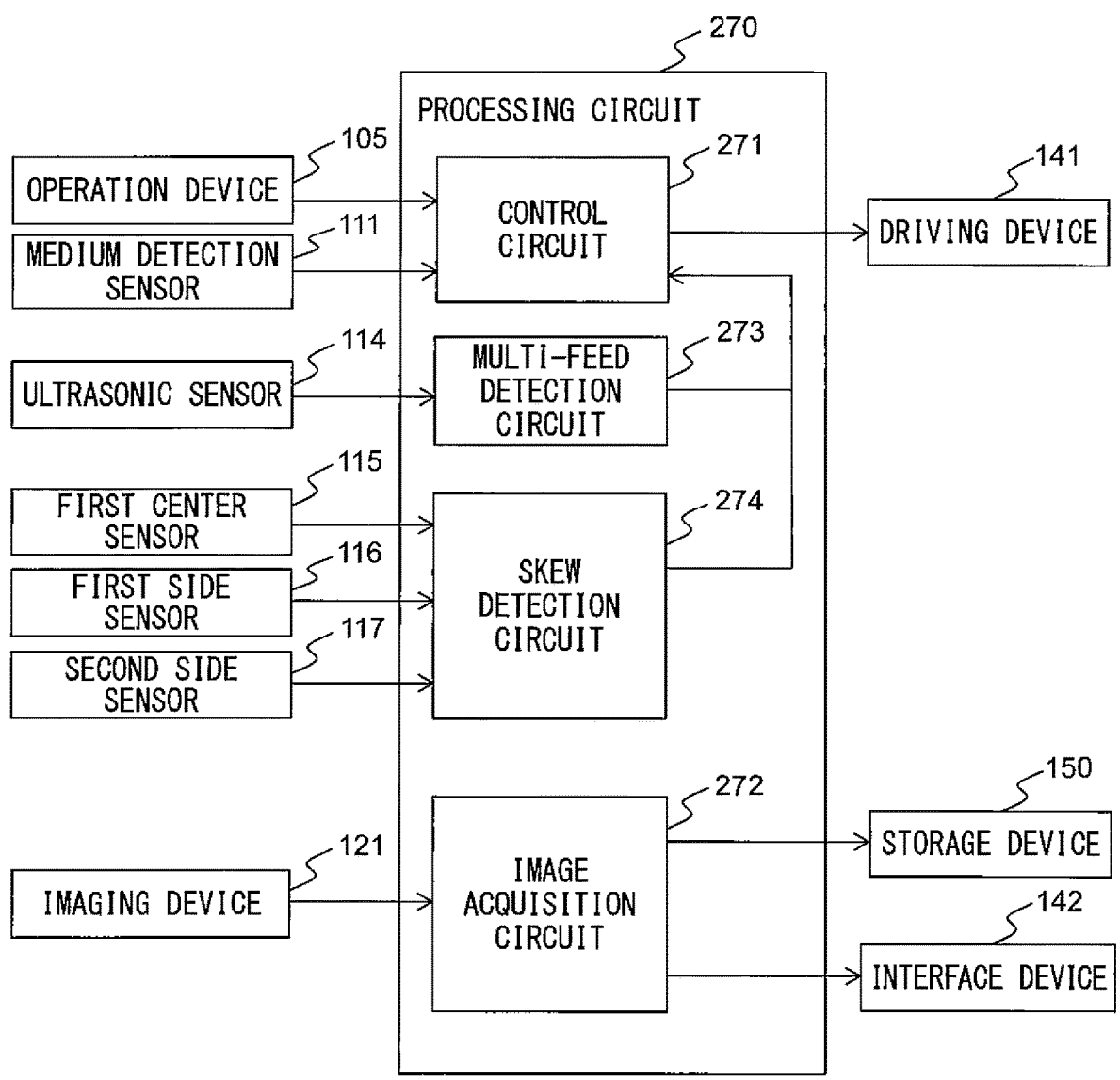
FIG. 18 is a diagram illustrating a schematic configuration of a processing circuit 270 in yet another medium conveying apparatus.

FIG. 18 is a diagram illustrating a schematic configuration of a processing circuit 270 in a medium conveying apparatus according to yet another embodiment. The processing circuit 270 is used in place of the processing circuit 160 in the medium conveying apparatus 100 and executes the medium reading processing, the multi-feed detection processing, and the skew detection processing in place of the processing circuit 160. The processing circuit 270 includes a control circuit 271, an image acquisition circuit 272, a multi-feed detection circuit 273, and a skew detection circuit 274.

The control circuit 271 is an example of a control module and has a function similar to the control module 161. The control circuit 271 receives an operation signal from an operation device 105, a medium detection signal from a medium detection sensor 111, a detection result of media multi-feed from the multi-feed detection circuit 273, and a detection result of a skew of a medium from the skew detection circuit 274. The control circuit 271 drives a driving device 141 based on each received signal and also when a skew of a medium is detected, corrects the skew of the medium. Further, when the media multi-feed is detected, the control circuit 271 performs control in such a way that a second driving force is transmitted to brake rollers 113 by a second transmission mechanism, and feed rollers 112 are driven to rotate by the brake rollers 113.

The image acquisition circuit 272 is an example of an image acquisition module and has a function similar to the image acquisition module 162. The image acquisition circuit 272 receives an input image from an imaging device 121 and stores the input image into a storage device 150, and also transmits the input image to an information processing device through an interface device 142.

The multi-feed detection circuit 273 is an example of a multi-feed detection module and has a function similar to the multi-feed detection module 163. The multi-feed detection circuit 273 receives an ultrasonic signal from an ultrasonic sensor 114, detects the media multi-feed based on the ultrasonic signal, and outputs the detection result to the control circuit 271.

The skew detection circuit 274 is an example of a skew detection module and has a function similar to the skew detection module 164. The skew detection circuit 274 receives a first center signal from a first center sensor 115, a first side signal from a first side sensor 116, and a second side signal from a second side sensor 117. The skew detection circuit 274 detects a skew of a medium based on each received signal and outputs the detection result to the control circuit 271.

As described in detail above, even when using the processing circuit 270, the medium conveying apparatus can more suitably correct a skew of a medium and also when the media multi-feed occurs, can more suitably restore the media.

Each part included in the processing circuit may be independently configured with an integrated circuit, a microprocessor, firmware, etc. Further, some parts included in the processing circuit may be configured with a circuit, and other parts may be configured with a functional module implemented by software operating on a processor.

According to this embodiment, the medium conveying apparatus, the method, and the computer-readable, non-transitory medium storing the control program, can more suitably correct a skew of a medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A medium conveying apparatus comprising:
   a plurality of motors;
   a plurality of feed rollers spaced in a direction perpendicular to a medium conveying direction, each of the feed rollers rotating independently at a respective speed by a corresponding one of the plurality of motors to feed a medium;
   a plurality of brake rollers, each of the plurality of brake rollers being positioned to face a corresponding one of the plurality of feed rollers;
   a plurality of torque limiters, each provided between a rotation shaft of a corresponding one of the plurality of brake rollers and a corresponding one of the plurality of brake rollers;
   an imaging device to image the medium; and
   a processor to:
      detect a skew of the medium;
      correct the skew of the medium by controlling the plurality of motors to change the speed of one of the plurality of feed rollers when the skew of the medium is detected, and
      when skew correction of the medium fails, make an imaging range of the imaging device in the medium conveying direction larger than an imaging range when skew of the medium is not occurring.

2. The medium conveying apparatus according to claim 1, further comprising a first sensor and a second sensor spaced in the direction perpendicular to the medium conveying direction on a downstream side of the plurality of feed rollers in the medium conveying direction, wherein
   the processor detects the skew of the medium when the first sensor does not detect the medium within a predetermined time after the second sensor detects the medium, and,
      when the skew of the medium is detected, the processor sets the speeds of the plurality of feed rollers to values greater than 0, and causes the plurality of feed rollers to rotate at the set speeds until a specified time elapses after the first sensor detects the medium.

3. A method for correcting a skew of a medium, comprising:
   feeding the medium by a plurality of feed rollers spaced in a direction perpendicular to a medium conveying direction, each of the feed rollers rotating independently at a respective speed by a corresponding one of a plurality of motors to feed the medium, and a plurality of brake rollers, each of the plurality of brake rollers being located to face a corresponding one of the plurality of feed rollers, wherein a plurality of torque limiters each provided between a rotation shaft of a corresponding one of the plurality of brake rollers and a corresponding one of the plurality of brake rollers;
   imaging the medium by an imaging device;
   detecting the skew of the medium;
   correcting the skew of the medium by controlling the plurality of motors to change the speed of one of the plurality of feed rollers when the skew of the medium is detected; and
   when skew correction of the medium fails, making an imaging range of the imaging device in the medium conveying direction larger than an imaging range when skew of the medium is not occurring.

4. The method according to claim 3, wherein
   the skew of the medium is detected when a first sensor does not detect the medium within a predetermined time after a second sensor detects the medium, in the detecting step, wherein the first sensor and the second sensor are spaced in the direction perpendicular to the medium conveying direction on a downstream side of the plurality of feed rollers in the medium conveying direction, and wherein
   when the skew of the medium is detected, the speeds of the plurality of feed rollers are set to values greater than 0, and the plurality of feed rollers are rotated at the set speeds until a specified time elapses after the first sensor detects the medium, in the correcting step.

5. A computer-readable, non-transitory medium storing a computer program, wherein the computer program causes a medium conveying apparatus including a plurality of motors, a plurality of feed rollers spaced in a direction perpendicular to a medium conveying direction, each of the feed rollers rotating independently at a respective speed by a corresponding one of the plurality of motors to feed a medium, a plurality of brake rollers, each of the plurality of brake rollers being located to face a corresponding one of the plurality of feed rollers, a plurality of torque limiters each provided between a rotation shaft of a corresponding one of the plurality of brake rollers and a corresponding one of the plurality of brake rollers, and an imaging device to image the medium, to execute a process, the process comprising:
   detecting a skew of the medium;
   correcting the skew of the medium by controlling the plurality of motors to change the speed of one of the plurality of feed rollers when the skew of the medium is detected; and
   when skew correction of the medium fails, making an imaging range of the imaging device in the medium conveying direction larger than an imaging range when skew of the medium is not occurring.

6. The medium according to claim 5, wherein
   the medium conveying apparatus further includes a first sensor and a second sensor spaced in the direction perpendicular to the medium conveying direction on a downstream side of the plurality of feed rollers in the medium conveying direction, wherein
   the skew of the medium is detected when the first sensor does not detect the medium within a predetermined time after the second sensor detects the medium, in the detecting step, and wherein when the skew of the medium is detected, the speeds of the plurality of feed rollers are set to value greater than 0, and the plurality of feed rollers are rotated at the set speeds until a specified time elapses after the first sensor detects the medium, in the correcting step.

* * * * *